United States Patent
Yonezawa

(10) Patent No.: US 7,325,798 B2
(45) Date of Patent: Feb. 5, 2008

(54) CLAMPING DEVICE AND CLAMPING SYSTEM USING THE SAME

(75) Inventor: Keitaro Yonezawa, Kobe (JP)

(73) Assignee: Kosmek Ltd, Kobe-shi, Hyogo (JP)

( * ) Notice: Subject to any disclaimer, the term of this patent is extended or adjusted under 35 U.S.C. 154(b) by 135 days.

(21) Appl. No.: 10/542,318

(22) PCT Filed: Jan. 19, 2004

(86) PCT No.: PCT/JP2004/000365

§ 371 (c)(1),
(2), (4) Date: Jul. 13, 2005

(87) PCT Pub. No.: WO2004/067224

PCT Pub. Date: Aug. 12, 2004

(65) Prior Publication Data

US 2006/0049569 A1    Mar. 9, 2006

(30) Foreign Application Priority Data

Jan. 29, 2003 (JP) ............................. 2003-020198
Apr. 14, 2003 (JP) ............................. 2003-144149

(51) Int. Cl.
*B23Q 3/00* (2006.01)
(52) U.S. Cl. ...................................... 269/309; 269/310
(58) Field of Classification Search ........ 269/309–310, 269/32; 279/4.12, 4.06
See application file for complete search history.

(56) References Cited

U.S. PATENT DOCUMENTS

| | | | |
|---|---|---|---|
| 5,820,118 A | 10/1998 | Craft | |
| 6,024,354 A * | 2/2000 | Yonezawa | 269/309 |
| 6,095,509 A * | 8/2000 | Yonezawa | 269/309 |
| 6,105,951 A | 8/2000 | Shibata | |
| 6,527,266 B1 * | 3/2003 | Yonezawa et al. | 269/309 |
| 6,604,738 B2 * | 8/2003 | Haruna | 269/309 |
| 2004/0046302 A1 * | 3/2004 | Bernhard et al. | 269/309 |
| 2006/0033255 A1 * | 2/2006 | Yonezawa et al. | 269/309 |
| 2006/0049568 A1 * | 3/2006 | Yonezawa et al. | 269/309 |
| 2006/0049569 A1 * | 3/2006 | Yonezawa | 269/309 |
| 2006/0055099 A1 * | 3/2006 | Haruna | 269/309 |

FOREIGN PATENT DOCUMENTS

| | | |
|---|---|---|
| EP | 0 322 617 A2 | 7/1989 |
| EP | 0 925 871 A2 | 6/1999 |
| EP | 1 078 713 A1 | 2/2001 |
| JP | 60-19824 U | 2/1985 |
| JP | 62-19141 U | 2/1987 |

* cited by examiner

*Primary Examiner*—Lee D Wilson
(74) *Attorney, Agent, or Firm*—Bacon & Thomas, PLLC

(57) ABSTRACT

A central pillar (20) is projected upward from a reference block (1), and an inner sleeve (21) is fitted to an outer periphery of the central pillar (20) vertically movably. The inner sleeve (21) is pushed upward by a coned disc spring (25). An outer sleeve (31) to be inserted into a socket hole (3) of a movable block (2) makes a tapering engagement with the inner sleeve (21) from above. The inner sleeve (21) and the outer sleeve (31) are adapted to be diametrically expandable and contractible. An output member (36) is inserted into the central pillar (20), and an upper portion of the output member (36) is connected to the outer sleeve (31). A driving mechanism (D) in the reference block (1) moves the outer sleeve (31) downward for locking via the output member (36).

25 Claims, 19 Drawing Sheets

CLAMPING DEVICE AND CLAMPING SYSTEM USING THE SAME

CROSS-REFERENCE TO RELATED APPLLICATIONS

Parent Data 10542318 is a national stage entry of PCT/JP04/00365 International Filing Date: Jan. 19, 2004.

TECHNICAL FIELD

The present invention relates to a clamping apparatus for fixing a movable block such as a work pallet or a work to a reference block such as a table of a machine tool, and furthermore, relates to a clamping system using the clamping apparatus.

BACKGROUND OF THE INVENTION

As such this clamping apparatus, one described in U.S. Pat. No. 5,820,118 is conventionally available. According to this prior art, a plurality of rotatable clamps are arranged around a work placed on a work pallet, and a damper of each of the clamps is adapted to press the work from above.

The above-mentioned prior art contains such problems that, since a plurality of the clamps are arranged around the work, it is difficult machining side surfaces of the work, in addition, it is impossible to machine an upper surface of the work at pressed portions by the clampers.

It is an object of the present invention to provide a new clamping apparatus that makes it possible for the respective surfaces of a movable block such as a work or a work pallet to be easily accessed, and to provide a new clamping system using this clamping apparatus.

SUMMARY OF THE INVENTION

In order to accomplish the object mentioned above, the present invention provides the clamping apparatus as described below and as illustrated in FIG. 2A, FIG. 5A, FIG. 6 or FIG. 10 respectively for example.

An annular central pillar 20 is projected from a reference block 1 toward a leading end, and an inner sleeve 21 is fitted onto the central pillar 20 axially movably within a predetermined range. The inner sleeve 21 is advanced toward the leading end by a predetermined advancing stroke by an advancing means 25. An outer sleeve 31 to be inserted into a socket hole 3 of a movable block 2 makes a wedge engagement with the inner sleeve 21 from the leading end side. The outer sleeve 31 is adapted to be diametrically expandable and contractible. An output member 36 is inserted into a cylindrical hole 20a of the annular central pillar 20 axially movably, and a leading end portion of the output member 36 is connected to the outer sleeve 31. A locking means 51 and a releasing means 52 are provided in the reference block 1. The locking means 51 moves the outer sleeve 31 toward a base end for locking via the output member 36, while the releasing means 52 moves the outer sleeve 31 toward the leading end for releasing via the output member 36.

The present invention functions as follows, for example, as shown in FIG. 2A.

In a released state shown in FIG. 2A, the releasing means 52 has moved the outer sleeve 31 toward the leading end via the output member 36, and the advancing means 25 has advanced the inner sleeve 21 toward the leading end by the predetermined advancing stroke.

To fix the movable block 2 to the reference block 1, the socket hole 3 is fitted onto the outer sleeve 31, and thereafter, the locking means 51 moves the output member 36 toward the base end for locking, and the outer sleeve 31 gradually makes a wedge engagement with the inner sleeve 21.

Then, first, the outer sleeve 31 diametrically expands via the inner sleeve 21 held at almost an advanced position by a pressing force of the advancing means 25, by which the outer sleeve 31 comes into contact with the socket hole 3. Next, the outer sleeve 31 diametrically expands while forcing the advancing means 25 to retreat toward the base end via the inner sleeve 21, and the outer sleeve 31 comes into close contact with the socket hole 3, and the outer sleeve 31 gradually forces the inner sleeve 21 to retreat toward the base end against the pressing force of the advancing means 25. Subsequently, when the inner sleeve 21 retreats by a dimension corresponding to the advancing stroke, the inner sleeve 21 is directly or indirectly received by the reference block 1. Then, the outer sleeve 31 makes a strong wedge engagement with the inner sleeve 21, which is received by the reference block 1, and the wedge engagement makes the outer sleeve 31 expand diametrically, by which the outer sleeve 31 comes into strong and close contact with the socket hole 3. Thereby, the output member 36 strongly presses a supported surface 2a of the movable block 2 toward a supporting surface 1a of the reference block 1 via the outer sleeve 31, which is in the strong and close contact state with the socket hole 3.

It is noted that, in the case where the supporting surface 1a of the reference block 1 and the supported surface 2a of the movable block 2 are in almost complete contact with each other at the beginning of the locking movement and where the supported surface 2a is received by the supporting surface 1a, the outer sleeve 31 operates as follows during the locking movement.

After the outer sleeve 31 comes into close contact with the socket hole 3, the outer sleeve 31 moves toward the base end while sliding on the socket hole 3 of the movable block 2 received by the reference block 1. Then, as mentioned above, the inner sleeve 21 retreats by the dimension corresponding to the advancing stroke, and when the inner sleeve 21 is blocked from retreating, the outer sleeve 31 comes into strong and close contact with the socket hole 3, and the outer sleeve 31 strongly presses the movable block 2 toward the reference block 1.

On the other hand, in the case where a gap remains between the supporting surface 1a of the reference block 1 and the supported surface 2a of the movable block 2 at the beginning of the locking movement for some reason, the outer sleeve 31 operates as follows during the locking movement.

After the outer sleeve 31 comes into close contact with the socket hole 3, the outer sleeve 31, which is in the close contact state with the socket hole 3, moves the movable block 2 toward the reference block 1 via the socket hole 3. Then, as mentioned above, the inner sleeve 21 retreats by the dimension corresponding to the advancing stroke, and when the inner sleeve 21 is blocked from retreating, the outer sleeve 31 comes into strong and close contact with the socket hole 3, and the outer sleeve 31 strongly presses the movable block 2 toward the reference block 1.

The present invention with the above-mentioned structure and function provides the following effects.

It becomes possible and easier to access five surfaces other than the supported surface among six surfaces of the movable block. Therefore, for example, in the case where a work as the movable block is fixed to the reference block, the five surfaces can be continuously machined by one clamping operation. In the case where a work pallet as the movable block is fixed to the reference block, available area of the work pallet is significantly increased.

It is noted that, in the present invention, it is preferable that a ceiling portion of an inner space of the outer sleeve 31 is hermetically covered with a ceiling wall provided at the leading end portion of the output member 36. In this case, foreign matter such as swarf and cutting oil can be prevented from entering the inner space of the outer sleeve 31 by the ceiling wall, by which the clamping apparatus can be used for a long time without any maintenance.

In addition, in order to accomplish the object mentioned above, another invention provides the clamping apparatus, for example, as described below and illustrated in FIG. 7A.

In place of the outer sleeve 31, which is diametrically expandable and contractible, an annular plug 71 to be inserted into the socket hole 3 is arranged on an outer periphery of the inner sleeve 21. A plurality of pressing members 72 are supported on a peripheral wall 71a of the annular plug 71 radially movably and are arranged circumferentially at intervals. Each of the pressing members 72 makes a wedge engagement with the inner sleeve 21 from the leading end side, and each of the pressing members 72 is adapted to be movable radially inward by a restoring means 74. The leading end portion of the output member 36 is connected to the annular plug 71.

The another invention functions as follows, for example, as illustrated in FIG. 7A, in substantially the same manner as the foregoing invention.

In a released state shown in FIG. 7A, the releasing means 52 has moved both the annular plug 71 and a plurality of the pressing members 72 toward the leading end via the output member 36, and the advancing means 25 has advanced the inner sleeve 21 toward the leading end by the predetermined advancing stroke.

To fix the movable block 2 to the reference block 1, the socket hole 3 is fitted onto both the annular plug 71 and a plurality of the pressing members 72, and thereafter, the locking means 51 moves the output member 36 toward the base end for locking, and each of a plurality of the pressing members 72 gradually makes a wedge engagement with the inner sleeve 21.

Then, first, each of the pressing members 72 moves radially outward via the inner sleeve 21 held at almost the advanced position by the pressing force of the advancing means 25, by which each of the pressing members 72 comes into contact with the socket hole 3. Next, each of the pressing members 72 moves radially outward while forcing the advancing means 25 to retreat toward the base end via the inner sleeve 21, and each of the pressing members 72 comes into close contact with the socket hole 3, and each of the pressing members 72 gradually forces the inner sleeve 21 to retreat toward the base end against the pressing force of the advancing means 25. Subsequently, when the inner sleeve 21 retreats by the dimension corresponding to the advancing stroke, the inner sleeve 21 is directly or indirectly received by the reference block 1. Then, each of the pressing members 72 makes a strong wedge engagement with the inner sleeve 21, which is received by the reference block 1, and each of the pressing members 72 moves radially outward, by which each of the pressing members 72 comes into strong and close contact with the socket hole 3. Thereby, the output member 36 strongly presses the supported surface 2a of the movable block 2 toward the supporting surface 1a of the reference block 1 via the pressing members 72, which is in the strong and close contact state with the socket hole 3.

It is noted that, in the case where the supporting surface 1a of the reference block 1 and the supported surface 2a of the movable block 2 are in almost complete contact with each other at the beginning of the locking movement and where the supported surface 2a is received by the supporting surface 1a, the pressing members 72 operate as follows during the locking movement.

After each of the pressing members 72 comes into close contact with the socket hole 3, each of the pressing members 72 moves toward the base end while sliding on the socket hole 3 of the movable block 2 received by the reference block 1. Then, as mentioned above, the inner sleeve 21 retreats by the dimension corresponding to the advancing stroke, and when the inner sleeve 21 is blocked from retreating, each of the pressing members 72 comes into strong and close contact with the socket hole 3, and these pressing members 72 strongly press the movable block 2 toward the reference block 1.

On the other hand, in the case where a gap remains between the supporting surface 1a of the reference block 1 and the supported surface 2a of the movable block 2 at the beginning of the locking movement for some reason, the pressing members 72 operate as follows during the locking movement.

After each of the pressing members 72 comes into close contact with the socket hole 3, the pressing members 72, which are in the close contact state with the socket hole 3, move the movable block 2 toward the reference block 1 via the socket hole 3. Then, as mentioned above, the inner sleeve 21 retreats by the dimension corresponding to the advancing stroke, and when the inner sleeve 21 is blocked from retreating, each of the pressing members 72 comes into strong and close contact with the socket hole 3, and these pressing members 72 strongly press the movable block 2 toward the reference block 1.

The another invention with the above-mentioned structure and funtion provides the following effects.

It becomes possible and easier to access five surfaces other than the supported surface among six surfaces of the movable block. Therefore, for example, in the case where a work as the movable block is fixed to the reference block, the five surfaces can be continuously machined by one clamping operation. In the case where a work pallet as the movable block is fixed to the reference block, available area of the work pallet is significantly increased.

It is noted that, in the another invention, it is preferable that a ceiling portion of an inner space of the annular plug 71 is hermetically covered with the ceiling wall provided at the leading end portion of the output member 36. In this case, foreign matter such as swarf and cutting oil can be prevented from entering the inner space of the annular plug 71 by the ceiling wall, by which the clamping apparatus can be used for a long time without any maintenance.

Furthermore, in order to accomplish the object mentioned above, still another invention provides a clamping apparatus, for example, as described below and illustrated in FIG. 2A, FIG. 7A, FIG. 11, FIG. 12A, FIG. 17A, FIG. 18A or FIG. 24, respectively.

An annular central pillar 20 is projected from a reference block 1 toward a leading end, an inner engaging member 21 is arranged on an outer periphery of the central pillar 20. An outer engaging member (31, 72) to be inserted into a socket hole 3 of a movable block 2 is adapted to be diametrically expandable and contractible. The outer engaging member (31, 72) makes a wedge engagement axially with the inner engaging member 21, and the outer engaging member (31, 72), which is in the wedge engaged state, is movable toward a base end and diametrically expandable for locking. An output member 36 is inserted into the annular central pillar 20 axially movably, and an output portion of the output member 36 is connected to either the outer engaging member (31, 72) or the inner engaging member 21. An input portion of the output member 36 is connectable to a driving means D.

It is noted that the driving means D can employ an automatic driving means using an actuator such as a fluid pressure cylinder and an electric motor, and can also employ a human-powered driving means.

The still another invention functions as follows, for example, as illustrated in FIG. 2A (or FIG. 7A), in substantially the same manner as the foregoing inventions.

In the released state shown in FIG. 2A (or FIG. 7A), the driving means D has moved the output member 36 toward the leading end and the outer engaging member 31 (72) has moved toward the leading end while contracting diametrically.

To fix the movable block 2 to the reference block 1, the socket hole 3 is fitted onto the outer engaging member 31, and thereafter, the driving means D moves the output member 36 toward the base end, and the outer engaging member 31 gradually makes a wedge engagement with the inner engaging member 21.

Then, first, the outer engaging member 31 (72) diametrically expands via the inner engaging member 21, by which the outer engaging member 31 comes into close contact with the socket hole 3. Subsequently, when the outer engaging member 31 is blocked from moving toward the base end, the outer engaging member 31 makes a strong wedge engagement with the inner engaging member 21, and the outer engaging member 31 diametrically expands, by which the outer engaging member 31 comes into strong and close contact with the socket hole 3. Thereby, the output member 36 strongly presses the supported surface 2a of the movable block 2 toward the supporting surface 1a of the reference block 1 via the outer engaging member 31, which is in the strong and close contact state with the socket hole 3.

It is noted that, in the case where the supporting surface 1a of the reference block 1 and the supported surface 2a of the movable block 2 are in almost complete contact with each other at the beginning of the locking movement and where the supported surface 2a is received by the supporting surface 1a, the outer engaging member 31 (72) operates as follows during the locking movement.

After the outer engaging member 31 comes into close contact with the socket hole 3, the outer engaging member 31 moves toward the base end while sliding on the socket hole 3 of the movable block 2 received by the reference block 1. Then, as mentioned above, when the outer engaging member 31 is blocked from moving toward the base end, the outer engaging member 31 comes into strong and close contact with the socket hole 3, and the outer engaging member 31 strongly presses the movable block 2 toward the reference block 1.

On the other hand, in the case where a gap remains between the supporting surface 1a of the reference block 1 and the supported surface 2a of the movable block 2 at the beginning of the locking movement for some reason, the outer engaging member 31 (72) operates as follows during the locking movement.

After the outer engaging member 31 comes into close contact with the socket hole 3, the outer engaging member 31, which is in the close contact state with the socket hole 3, moves the movable block 2 toward the reference block 1 via the socket hole 3. Then, as mentioned above, when the outer engaging member 31 is blocked from moving toward the base end, the outer engaging member 31 comes into strong and close contact with the socket hole 3 and the outer engaging member 31 strongly presses the movable block 2 toward the reference block 1.

The still another invention with the above-mentioned structure and function provides the following effects.

It becomes possible and easier to access five surfaces other than the supported surface among six surfaces of the movable block. Therefore, for example, in the case where a work as the movable block is fixed to the reference block, the five surfaces can be continuously machined by one clamping operation. In the case where a work pallet as the movable block is fixed to the reference block, available area of the work pallet is significantly increased.

In the still another invention, it is preferable that, for example, as illustrated in FIG. 2A or FIG. 12A, the outer engaging member is composed of an annular outer sleeve 31. In this case, the outer engaging member can be mechanically simple and compact in size.

The still another invention includes the following clamping apparatus.

For example, as illustrated in FIG. 7A or FIG. 17A, the outer engaging member is composed of a plurality of pressing members 72 arranged circumferentially at intervals, and an annular plug 71 to be inserted into the socket hole 3 is arranged on an outer periphery of the inner engaging member 21. Each of the pressing members 72 is supported on a peripheral wall 71a of the annular plug 71 radially movably and is movable radially inward by a restoring means 74. The output portion of the output member 36 is connected to either the annular plug 71 or the inner engaging member 21.

In this case, the pressing members can be significantly projected out diametrically outward, by which the present invention becomes applicable even when fitting gaps between outer peripheral surfaces of the pressing members and the socket hole are large.

In the respective invention described above, for example, as shown in FIG. 2A or FIG. 7A, it is preferable that the inner sleeve (or the inner engaging member) 21 is diametrically expandable and contractible. In this case, during the locking movement, the inner sleeve (or the inner engaging member) diametrically contracts when the outer sleeve (or the outer engaging member) gradually makes a wedge engagement with the inner sleeve (or the inner engaging member), by which the inner peripheral surface of the inner sleeve (or the inner engaging member) comes into close contact with an outer peripheral surface of the central pillar. Therefore, the movable member can be constrained on the reference block via the outer sleeve (or the outer engaging member), the inner sleeve (or the inner engaging member) and the central pillar in the recited order. Thereby, a clamping apparatus with a positioning function can be provided.

The still another invention includes the following clamping apparatus.

For example, as shown in FIG. 2A or FIG. 7A, the outer engaging member 31 (72) is advanced toward the leading end by an advancing means 25, and during the locking movement, the outer engaging member 31 (72) moves toward the base end against the advancing means 25 while diametrically expanding.

According to this invention, the function of the advancing means makes it possible to drive the outer engaging member toward the base end after the outer engaging member has been diametrically expanded and has come into close contact with the socket hole, by which a strong locking force can be secured.

It is noted that, the advancing means 25 is only required to advance the outer engaging member 31 (72) toward the leading end, and it is possible that the advancing means 25 directly advances the outer engaging member 31 (72) or indirectly advances the outer engaging member 31 (72) via another member such as the inner engaging member 21. In addition, the advancing means 25 can employ an elastic material such as a spring or rubber, or such as a fluid pressure cylinder.

In addition, the still another invention includes the following clamping apparatus.

For example, as shown in FIG. 18A or FIG. 24, the inner engaging member 21 is diametrically expandable and contractible, an annular clearance 92 is formed between the central pillar 20 and the inner engaging member 21, and during the locking movement, the outer engaging member (31, 72) diametrically contracts the inner engaging member 21, and the outer engaging member (31, 72) moves toward the base end while diametrically expanding.

According to this invention, since the inner engaging member has the function as the above-mentioned advancing means, an exclusive advancing means can be omitted, by which the clamping apparatus can be mechanically simple.

In the still another invention, for example, as shown in FIG. 2A or FIG. 7A, it is preferable that the outer engaging member 31 (72) makes a wedge engagement with the inner engaging member 21 from the leading end side. In this case, a strong locking force can be secured during the locking movement.

In the still another invention, for example, as shown in FIG. 12A or FIG. 17A, the outer engaging member 31 (72) may make a wedge engagement with the inner engaging member 21 from the base end side.

In the above-described respective invention, for example, as shown in FIG. 2A or FIG. 7A, it is preferable that substantially an entire circumference of an inner peripheral surface of the inner sleeve (or the inner engaging member) 21 is adapted to come into close contact with an outer peripheral surface of the central pillar 20. In this case, positioning accuracy of the positioning function is further improved.

In the above-described respective invention, for example, as shown in FIG. 2A or FIG. 7A, it is preferable that at least one slit 22 is provided in a peripheral wall of the inner sleeve (or the inner engaging member) 21, and the inner sleeve (or the inner engaging member) 21 is diametrically expandable by its own elastic restoring force. In this case, the inner sleeve (or the inner engaging member) can be mechanically simple and compact in size.

In the above-described respective invention, for example, as shown in FIG. 4, it is preferable that a pair of projecting portions 62, 62, which radially face each other, are provided on at least one of the outer periphery of the central pillar 20, the inner or outer periphery of the inner engaging member 21 and the inner or outer periphery of the outer sleeve (or the outer engaging member) 31, and escape grooves 63, 63 are formed between these projecting portions 62, 62. In this case, an axial gap between the axis of the socket hole and the axis of the central pillar can be absorbed by these escape grooves.

In the respective invention, for example, as shown in FIG. 2A or FIG. 7A, it is preferable that the central pillar 20 is fixed to the reference block 1.

In addition, for example, as shown in FIG. 5A and FIG. 5B, or, FIG. 15A and FIG. 15B, it is preferable that the inner sleeve (or the inner engaging member) 21 is attached to at least one of the central pillar 20 and the output member 36 radially movably. In this case, the axial gap between the axis of the socket hole and the axis of the central pillar can be absorbed by a radial movement of the inner sleeve (or the inner engaging member) and a radial movement of the outer sleeve.

In the above-described respective invention, for example, as shown in FIG. 6 or FIG. 16, the central pillar 20 may be supported on the reference block 1 radially movably. In this case, the axial gap between the axis of the socket hole and the axis of the central pillar can be absorbed by a radial movement of the central pillar.

The above-described respective invention includes the following clamping apparatus.

For example, as shown in FIG. 25, in a state that the output member 36 has moved toward the leading end for releasing, the movable block 2 is received by the reference block 1 via the output member 36, and a seating gap alpha is formed between the support surface 1a of the reference block 1 and the supported surface 2a of the movable block 2.

According to this invention, when the movable block is mounted to the reference block, the supported surface of the movable block can be prevented from colliding with the supporting surface of the reference block by the output member, whereby the supporting surface can be prevented from being damaged. Therefore, the positioning function of the clamping apparatus can be kept excellent for a long time.

A new clamping system of the present invention uses the above-described clamping apparatus, and is composed as follows, for example, as shown in FIG. 1 through FIG. 4.

Two of the socket holes 3, 3 are provided in the movable block 2 at a predetermined interval. A first plug means 11 and a second plug means 12 corresponding to the respective socket hole 3, 3 are provided in the reference block 1. Each of the plug means 11, 12 has the central pillar 20, the inner sleeve (or the inner engaging member) 21 and the outer sleeve 31. The first plug means 11 is composed so that substantially an entire circumference of an inner peripheral surface of the inner sleeve (or the inner engaging member) 21 is adapted to come into close contact with an outer peripheral surface of the central pillar 20. The second plug means 12 is provided with a pair of projecting portions 62, 62, which radially face each other, on at least one of the outer periphery of the central pillar 20, the inner or outer periphery of the inner sleeve (or the inner engaging member) 21 and the inner or outer periphery of the outer sleeve 31, while escape grooves 63, 63 are formed between these projecting portions 62, 62. According to this invention, the movable block can be accurately positioned on and fixed to the reference block with a mechanically simple structure.

The invention of the clamping system includes the following structure shown in FIG. 1 and FIG. 7A for example.

Two of the socket holes 3, 3 are provided in the movable block 2 at a predetermined interval. A first plug means 11 and a second plug means 12 corresponding to the respective socket hole 3, 3 are provided in the reference block 1. Each of the plug means 11, 12 has the central pillar 20, the inner sleeve (or the inner engaging member) 21, the annular plug 71 and a plurality of the pressing members 72. The first plug means 11 is composed so that substantially an entire circumference of an inner peripheral surface of the inner sleeve (or the inner engaging member) 21 is adapted to come into close contact with an outer peripheral surface of the central pillar 20, and three or more of the pressing members 72 are arranged circumferentially at intervals. The second plug means 12 is provided with two of the pressing members 72, which radially face each other. According to this invention, the movable block can be accurately positioned on and fixed to the reference block with a mechanically simple structure.

In the above-described clamping system, for example, as shown in FIG. 1, FIG. 5A and FIG. 5B, it is preferable that at least one other socket hole 3 is provided in the movable block 2, and a third plug means 13 only for locking corresponding to said other socket hole 3 is provided in the reference block 1. In this case, the movable block can be strongly fixed to the reference block by the third plug means.

In addition, in the above-mentioned clamping system, for example, as shown in FIG. 1, FIG. 5A and FIG. 5B, the third plug means 13 has the central pillar 20, the inner sleeve (or the inner engaging member) 21 and the outer sleeve 31, and the central pillar 20 is fixed to the reference block 1. It is preferable that the inner sleeve (or the inner engaging member) 21 is attached to at least one of the central pillar 20 and the output member 36 radially movably. In this case, absorption of an axial gap between the axis of the socket hole and the axis of the central pillar by a radial movement of the inner sleeve (or the inner engaging member) and a radial movement of the outer sleeve can be consistent with security of a strong locking force.

For example, as shown in FIG. 1, FIG. 7A and FIG. 7B, it is preferable that the third plug means 13 has the central pillar 20, the inner sleeve (or the inner engaging member) 21, the annular plug 71 and a plurality of the pressing members 72, and the central pillar 20 is fixed to the reference block 1, and the inner sleeve (or the inner engaging member) 21 is attached to the central pillar 20 radially movably. In this case, absorption of the axial gap between the axis of the socket hole and the axis of the central pillar by the radial movement of the inner sleeve (or the inner engaging member) and the radial movement of the pressing members can be also consistent with security of the strong locking force.

In addition, for example, as shown in FIG. 1 and FIG. 6, the third plug means 13 may have the central pillar 20, the inner sleeve (or the inner engaging member) 21 and the outer sleeve 31, and the central pillar 20 is supported on the reference block 1 radially movably. In this case, absorption of the axial gap between the axis of the socket hole and the axis of the central pillar by a radial movement of the central pillar can be consistent with security of the strong locking force.

Furthermore, the third plug means 13 may have the central pillar 20, the inner sleeve (or the inner engaging member) 21, the annular plug 71 and a plurality of the pressing members 72, and the central pillar 20 is supported on the reference block 1 radially movably. In this case, absorbing of the axial gap between the axis of the socket hole and the axis of the central pillar can be also consistent with the security of the strong locking force.

BRIEF DESCRIPTION OF THE DRAWINGS

FIG. 1 through FIG. 5B illustrate a first embodiment according to the present invention, wherein FIG. 1 is a schematic view illustrating the principle of a clamping system using the present invention, and is a horizontal sectional view of the clamping system;

FIG. 3 is an enlarged sectional view indicated by the arrow 3-3 in FIG. 2A, illustrating a positioning mechanism provided in the clamping apparatus;

FIG. 4 is a view similar to FIG. 3, illustrating another positioning mechanism provided in the clamping apparatus;

FIG. 5A and FIG. 5B illustrate another clamping apparatus of the clamping system, wherein FIG. 5A is a partial view similar to FIG. 2A;

FIG. 5B is a view similar to FIG. 3;

FIG. 7A through FIG. 8 illustrate a clamping apparatus of a second embodiment according to the present invention, wherein FIG. 7A is a view similar to FIG. 2A, corresponding to a view indicated by the arrow 7A-7A in FIG. 7B;

FIG. 8 is an enlarged horizontal sectional view of a main portion in FIG. 7A, illustrating a restoring means of a pressing member;

FIG. 12A through FIG. 15B illustrate a clamping apparatus of a fourth embodiment according to the present invention, wherein FIG. 12A is a view similar to FIG. 2A;

FIG. 13 is a view similar to FIG. 3, illustrating a positioning mechanism provided in the clamping apparatus;

FIG. 14 is a view similar to FIG. 4, illustrating another positioning mechanism provided in the clamping apparatus;

FIG. 15A and FIG. 15B illustrate another clamping apparatus of the fourth embodiment, wherein FIG. 15A is a view similar to FIG. 5A;

FIG. 15B is a view similar to FIG. 5B;

FIG. 17A and FIG. 17B illustrate a clamping apparatus of a fifth embodiment according to the present invention, wherein FIG. 17A is a view similar to FIG. 7A;

FIG. 17B is a view similar to FIG. 7B;

FIG. 18A through FIG. 21B illustrate a clamping apparatus of a sixth embodiment according to the present invention, wherein FIG. 18A is a view similar to FIG. 2A;

FIG. 21A and FIG. 21B illustrate another clamping apparatus of the sixth embodiment, wherein FIG. 21A is a view similar to FIG. 5A;

FIG. 21 B is a view similar to FIG. 5B;

BEST MODE FOR CARRYING OUT THE INVENTION

FIG. 1 through FIG. 5B show a first embodiment according to the present invention, illustrating a clamping apparatus of the present invention applied to a clamping system for a work pallet.

Figure 1:
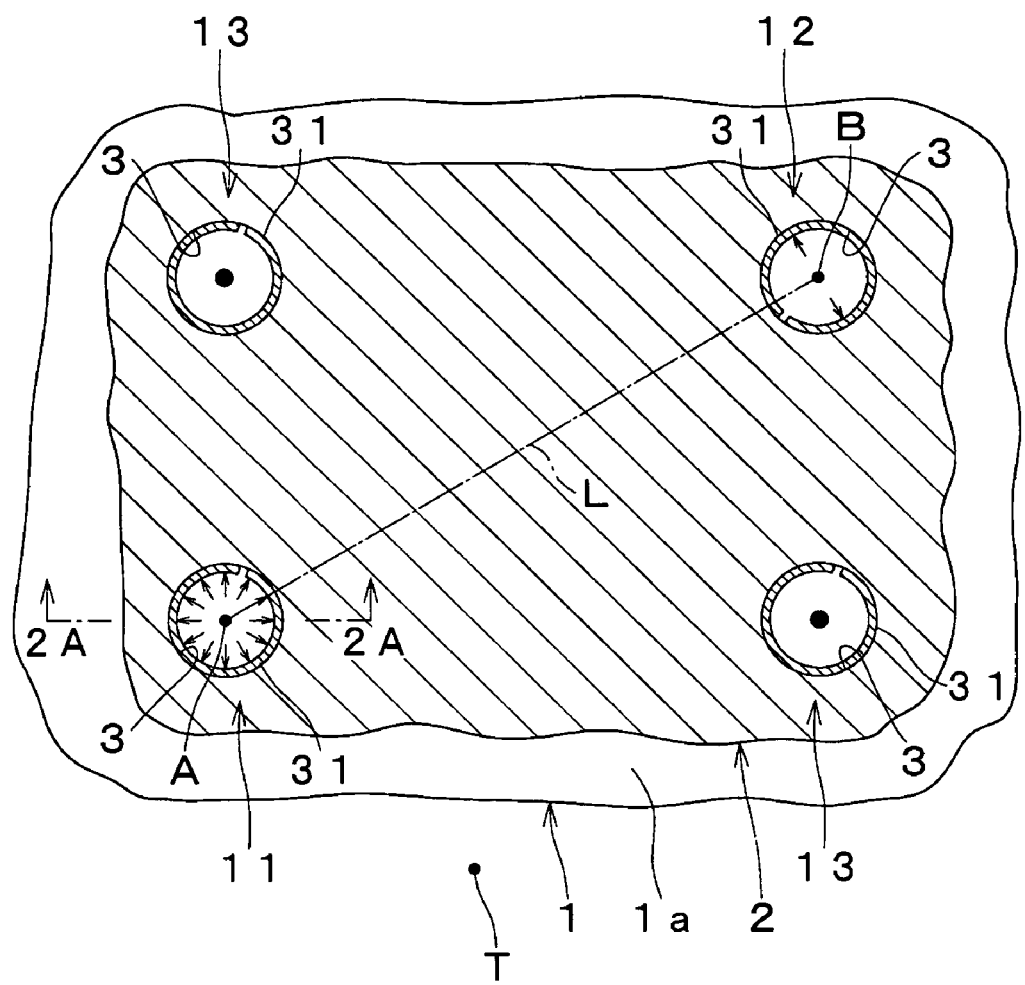
Figure 2B:
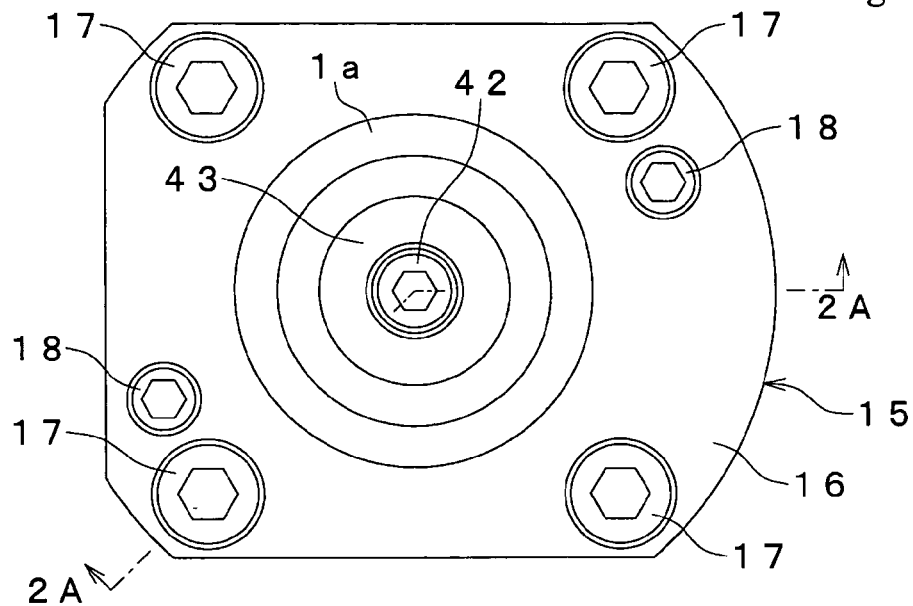
FIG. 2B is a plan view of the clamping apparatus.
Figure 2A:
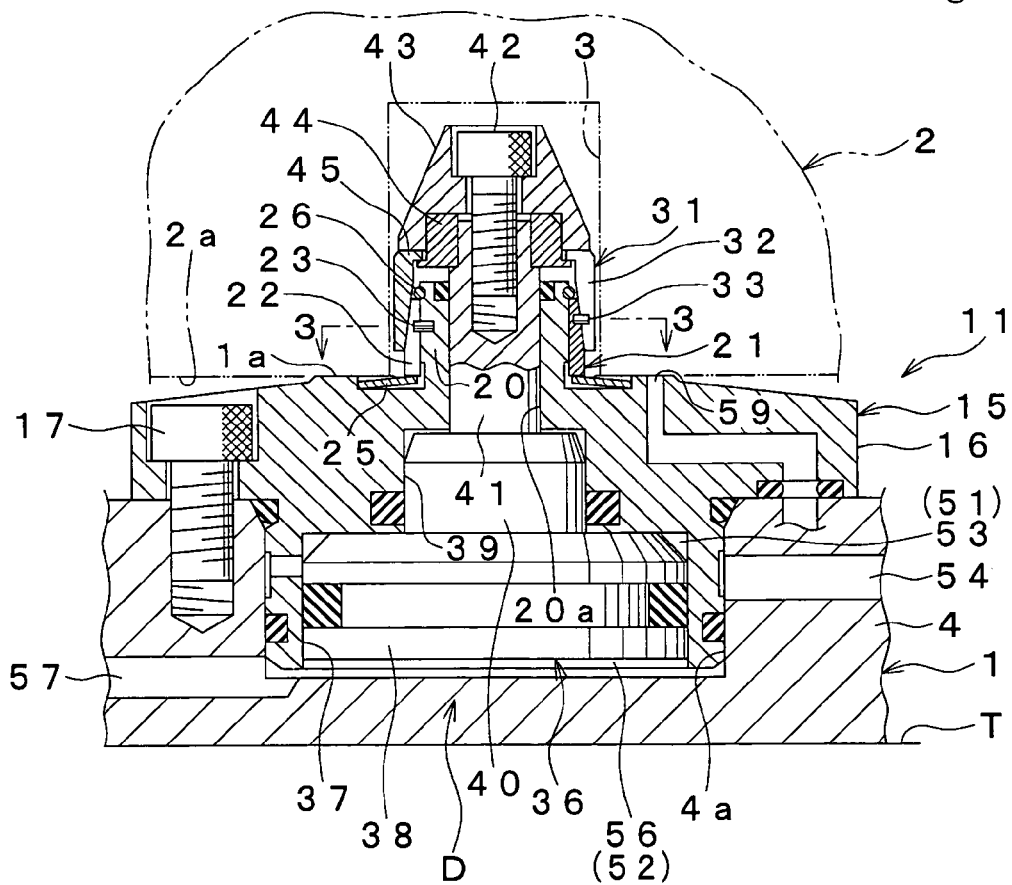
FIG. 2A is an elevational sectional view of a released state of a clamping apparatus of the clamping system, corresponding to a view indicated by the arrow 2A-2A in FIG. 1 or FIG. 2B.

In this embodiment, as shown in FIG. 1 and FIG. 2A, a reference block 1 is placed on a table T of a machine tool, and a supported surface 2a of the work pallet 2 as a movable block is received by a supporting surface 1a of the reference block 1. In the supported surface 2a are opened a plurality of socket holes 3 formed into circular straight holes. Herein, four of the socket holes 3 are illustrated.

The reference block 1 is provided with a base plate 4 fixed to the table T. Corresponding to the socket holes 3, the base plate 4 is provided with both a first plug means 11 and a second plug means 12, both of which have both a positioning function and a locking function, and with two third plug means 13, 13, which have only a locking function. The first plug means 11 and the second plug means 12 are arranged diagonally, and the two of the third plug means 13, 13 are also arranged diagonally.

As shown in FIG. 1, the first plug means 11 radially expands an outer sleeve 31 described later by a wedge action to bring substantially an entire circumference of a peripheral wall of the outer sleeve 31 into close contact with the socket hole 3, and the first plug means 11 positions the work pallet 2 on the reference block 1 in a horizontal direction via the outer sleeve 31. Subsequently, the outer sleeve 31, which is in the close contact state with the socket hole 3, is driven downward to fix the work pallet 2 to the reference block 1.

As shown in FIG. 1, the second plug means 12 is composed so as to apply a diametrically expanding force to the outer sleeve 31 in two directions substantially orthogonal to a straight line L connecting both the axis A and B of central pillars 20, 20 described later, and to bring two points in the circumferential direction of the outer sleeve 31 into close contact with the socket hole 3, whereby the work pallet 2 is prevented from rotating around the axis A. Subsequently, the outer sleeve 31, which is in the close contact state with the socket hole 3, is driven downward to fix the work pallet 2 to the reference block 1.

The third plug means 13 is formed so that the outer sleeve 31 is radially movable relative to the central pillar 20 described later, so that the third plug means 13 does not have the positioning function mentioned above.

The first plug means 11 and the second plug means 12 have the same structure except for differences described later, and are basically the same in the following structural points.

Into a installation hole 4a of the base plate 4 is fitted a housing 15, and a flange 16 of the housing 15 is fixed to a peripheral wall of the installation hole 4a by four fastening bolts 17. It is noted that the reference numeral 18 denotes a jack bolt. To extract the housing 15 from the installation hole 4a, it is only required that the jack bolt 18 is screwed downward and a lower end of the jack bolt 18 is pressed toward the base plate 4.

The annular central pillar 20 is projected upward (toward a leading end) from the housing 15. The axis of the central pillar 20 substantially coincides with the axis of the installation hole 4a. An upper surface of the flange 16 forms the above-mentioned supporting surface 1a.

Onto an outer periphery of the central pillar 20 is fitted a collet-shaped inner sleeve (an inner engaging member) 21 vertically movably within a predetermined range. Herein, one slit 22, which vertically extends, is formed in a peripheral wall of the inner sleeve 21, by which the inner sleeve 21 is diametrically expandable and contractible, and the inner sleeve 21 is expanded diametrically and slightly by its own elastic restoring force. It is noted that a leading end of a whirl-stop pin 23 fixed to the central pillar 20 is inserted into the slit 22. It is preferable that a sealing member (not shown) made of rubber or the like is attached to the slit 22.

The inner sleeve 21 is urged upward by an advancing means composed of one coned disc spring 25. An upper end of the inner sleeve 21 is received by a retaining ring 26 attached to an upper portion of the central pillar 20.

A tapered inner surface of the outer sleeve (an outer engaging member) 31 to be inserted into the socket hole 3 makes a tapering engagement (a wedge engagement) with a tapered outer surface of the inner sleeve 21 from above. Both the tapered inner surface of the outer sleeve 31 and the tapered outer surface of the inner sleeve 21 are formed in such a manner as to narrow upward. The outer sleeve 31 is formed into a collet shape like the inner sleeve 21. Namely, one slit 32, which vertically extends, is formed in a peripheral wall of the outer sleeve 31, by which the outer sleeve 31 is diametrically expandable and contractible, and the outer sleeve 31 is diametrically contracted by its own elastic restoring force. It is noted that a leading end of a rotation stopper pin 33 fixed to the inner sleeve 21 is inserted into the slit 32. It is preferable that a sealing member (not shown) made of rubber or the like is attached to the slit 32.

Into the housing 15 is inserted an output member 36 vertically movably. The output member 36 is provided with a piston 38, which is hermetically inserted into a cylinder hole 37 at a lower portion of the housing 15, a piston rod 40, which projects upward from the piston 38 and is hermetically inserted into a rod hole 39, an output rod 41, which projects upward from the piston rod 40 and is inserted into a cylindrical hole 20a of the central pillar 20, a cap 43, which is fixed to an upper portion of the output rod 41 by a joint bolt 42, and a ring 44, which is pressed to the upper portion of the output rod 41 by the cap 43.

Between a lower flange of the ring 44 and a lower surface of the cap 43 is fitted an upper flange 45 of the outer sleeve 31 radially slidably.

With the above-described structure, an inner space of the outer sleeve 31 can be covered with the cap 43 and the ring 44, by which foreign matter such as swarf and cutting oil can be prevented from entering the inner space of the outer sleeve 31. In other words, both the cap 43 and the lower flange of the ring 44 form a ceiling wall of the inner space of the outer sleeve 31.

In the housing 15 are provided a locking means 51 and a releasing means 52, as a driving means D. The locking means 51 is composed of the piston 38 and a lock chamber 53 formed above the piston 38. The lock chamber 53 communicates with a supply and discharge port 54, which is for pressurized oil for locking. The releasing means 52 is composed of the piston 38 and a release chamber 56 formed below the piston 38. The release chamber 56 communicates with a supply and discharge port 57, which is for pressurized oil for releasing.

In addition, the first plug means 11 is provided with a seating confirmation means. Namely, in the supporting surface 1a is opened a detection nozzle hole 59, and into the detection nozzle hole 59 is supplied compressed air for detection. Then, when the supported surface 2a comes into contact with the supporting surface 1a, the pressure in the detection nozzle hole 59 increases. It can be confirmed that the work pallet 2 is seated on the housing 15 by detecting the increase of the pressure using a pressure switch, etc.

Figure 3:
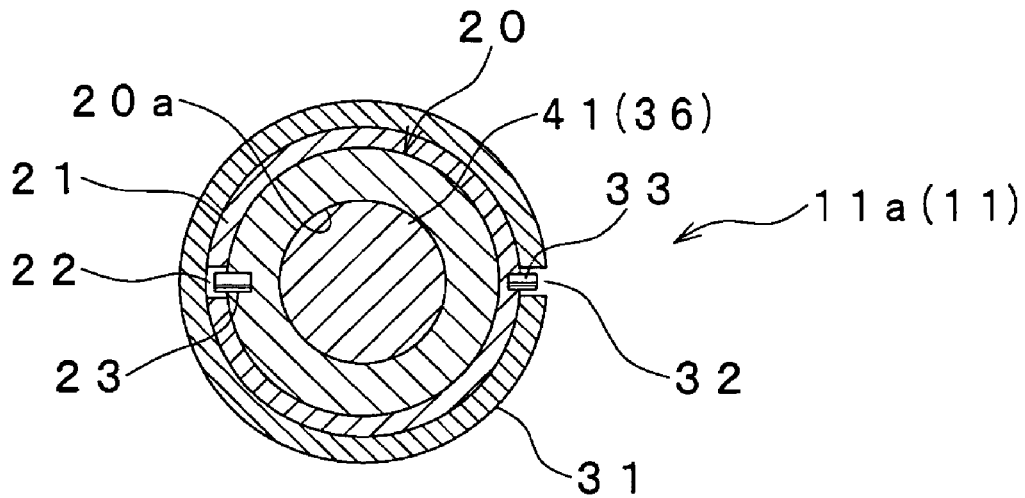

As shown in FIG. 3, a positioning mechanism 11a of the first plug means 11 is composed so that substantially an entire circumference of an inner peripheral surface of the inner sleeve 21 is adapted to come into close contact with an outer peripheral surface of the central pillar 20. Therefore, the inner sleeve 21 is adapted to expand substantially an entire circumference of the peripheral wall of the outer sleeve 31 radially outward (see FIG. 1).

The positioning mechanism 12a of the second plug means 12 is different from the positioning mechanism 11a of the first plug means 11 in the following structural points.

Figure 4:
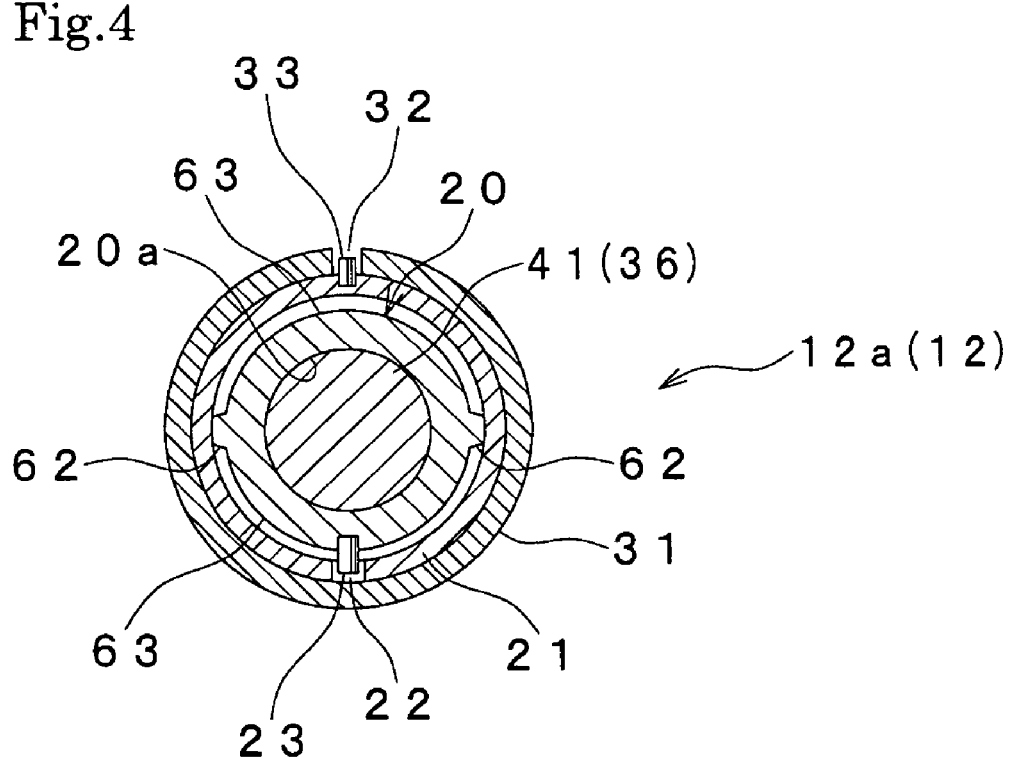

As shown in FIG. 4, a pair of projecting portions 62, 62, which radially face each other, are provided on the outer periphery of the central pillar 20, and escape grooves 63, 63 are formed between these projecting portions 62, 62. Thereby, the projecting portions 62, 62 generate a diametrically expanding force at two points, which radially face each other, on the peripheral wall of the outer sleeve 31 via the inner sleeve 21 (see FIG. 1).

Instead of or in addition to projecting the projecting portions 62, 62 from the central pillar 20, the projecting portions 62, 62 may be projected inward from an inner peripheral surface of the outer sleeve 31 or may be projected outward from an outer peripheral surface of the outer sleeve 31. Furthermore, the projecting portions 62, 62 may be projected inward from the inner peripheral surface of the inner sleeve 21 or may be projected outward from an outer peripheral surface of the inner sleeve 21.

Figure 5B:
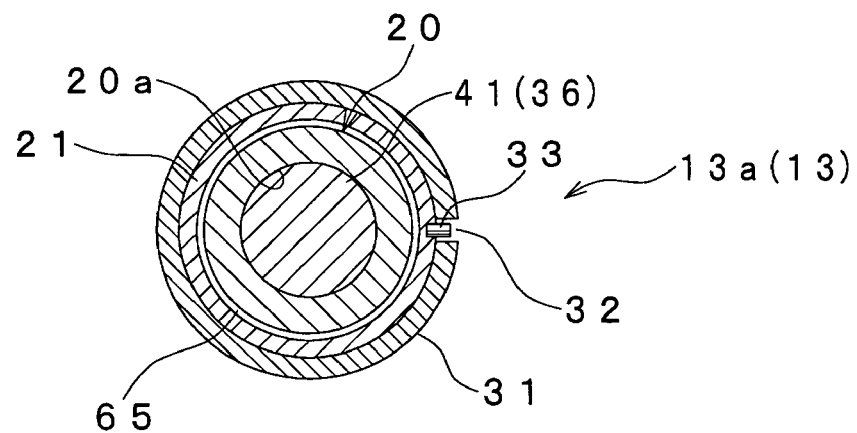
Figure 5A:
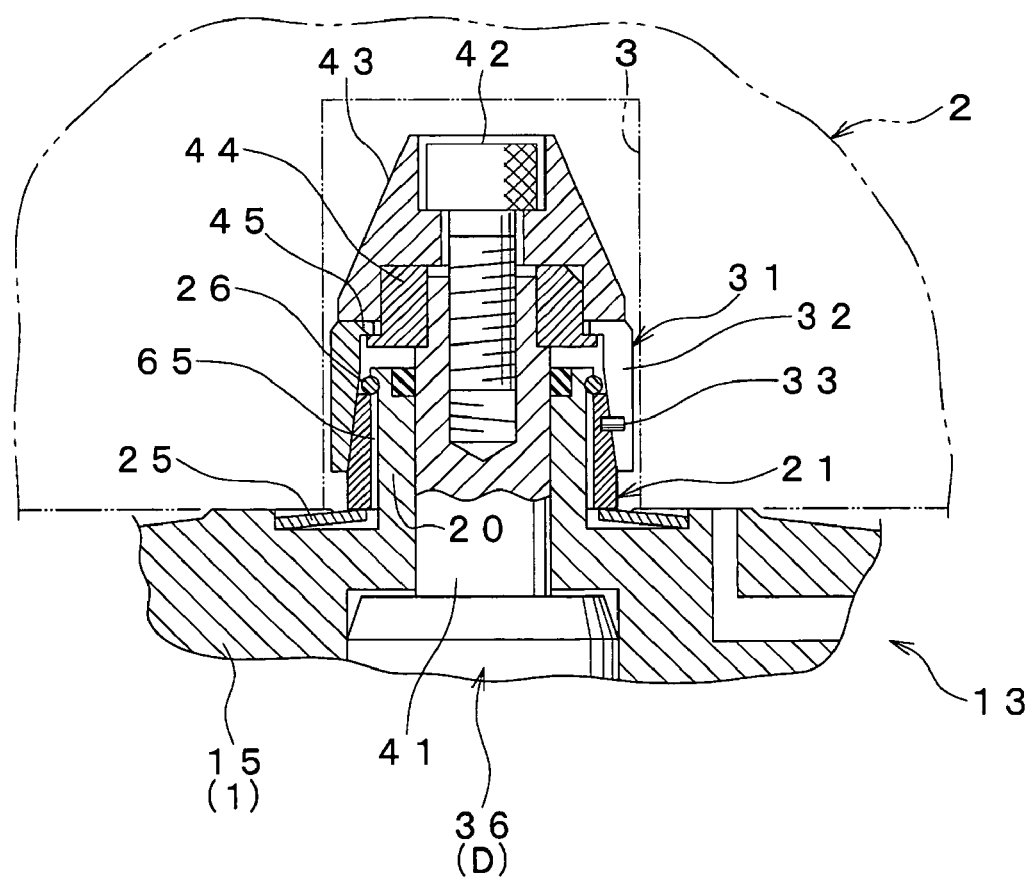

The third plug means 13 is different from the first plug means 11 in the following structural points as shown in FIG. 5A and FIG. 5B. FIG. 5A and FIG. 5B are similar to FIG. 2A and FIG. 3, respectively.

The peripheral wall of the inner sleeve 21 is formed in a circumferentially seamless manner without any slit. The inner sleeve 21 is fitted onto the central pillar 20 radially movably with a radial clearance 65 spaced. As described above, between the cap 43 and the ring 44 is supported the outer sleeve 31 radially movably. Thereby, the inner sleeve 21 and the outer sleeve 31 are allowed to move radially relative to the central pillar 20, by which an axial gap between the axis of the socket hole 3 and the axis of the central pillar 20 can be canceled.

The first plug means 11, the second plug means 12 and the third plug means 13 operates in almost the same manner as follows.

In a released state shown in FIG. 2A, pressurized oil in the lock chamber 53 has been discharged and pressurized oil has been supplied to the release chamber 56. Thereby, the piston 38 has made the output rod 41 ascend, and the output rod 41 has made the outer sleeve 31 ascend via the cap (an output portion) 43 and the ring 44, and the outer sleeve 31 has been switched into a diametrically contracted state. The inner sleeve 21 has ascended by an advancing stroke by the coned disc spring 25, and has made a slight tapering engagement with the outer sleeve 31 or has been facing the outer sleeve 31 with a slight gap spaced therebetween.

To position the work pallet 2 on the reference block 1, first, as shown in FIG. 1 and FIG. 2A, the work pallet 2 is made to descend with the plug means 11, 12, 13 being in the above-mentioned released state to fit the socket hole 3 onto the outer sleeve 31.

Next, the pressurized oil in the release chamber 56 is discharged and pressurized oil is supplied to the lock chamber 53. Then, the piston 38 makes the outer sleeve 31 descend via the output rod 41 and the cap (the output portion) 43, and the tapered inner surface of the outer sleeve 31 gradually makes a wedge engagement with the tapered outer surface of the inner sleeve 21.

Then, the outer sleeve 31 diametrically expands via the inner sleeve 21 held at almost a raised position by an urging force of the coned disc spring 25, and the outer sleeve 31 comes into contact with the socket hole 3. Next, the outer sleeve 31 diametrically expands while compressing the coned disc spring 25 downward via the inner sleeve 21, and the outer sleeve 31 comes into close contact with the socket hole 3, and the outer sleeve 31 positions the work pallet 2 in the horizontal direction via the diametrically contracted inner sleeve 21 and via the central pillar 20, and simultaneously, the outer sleeve 31 forces the inner sleeve 21 to retreat gradually downward against the urging force of the coned disc spring 25. Subsequently, when the inner sleeve 21 descends by a dimension corresponding to the advancing stroke with the coned disc spring 25 being fully compressed, the inner sleeve 21 is received by the housing 15 via the coned disc spring 25. Then, the outer sleeve 31 makes a strong wedge engagement with the inner sleeve 21, which is received by the housing, to expand diametrically, by which the outer sleeve 31 comes into strong and close contact with the socket hole 3. Thereby, the output member 36 strongly presses the supported surface 2a of the work pallet 2 toward the supporting surface 1a of the reference block 1 via the outer sleeve 31, which is in the strong and close contact state with the socket hole 3.

It is noted that, in the case where the supporting surface 1a and the supported surface 2a are in almost complete contact with each other at the beginning of the locking movement and where the supported surface 2a is received by the supporting surface 1a, the outer sleeve 31 operates as follows during the locking movement.

After the outer sleeve 31 comes into close contact with the socket hole 3, the outer sleeve 31 descends downward while sliding on the socket hole 3. Then, as mentioned above, when the inner sleeve 21 makes the coned disc spring 25 be in the fully compressed state, the outer sleeve 31 comes into strong and close contact with the socket hole 3, and the outer sleeve 31 strongly presses the movable block 2 to the reference block 1.

On the other hand, in the case where a gap remains between the supporting surface 1a and the supported surface 2a at the beginning of the locking movement for some reason, the outer sleeve 31 operates as follows during the locking movement.

After the outer sleeve 31 comes into close contact with the socket hole 3, the outer sleeve 31, which is in the close contact state with the socket hole 3, pulls the movable block 2 downward via the socket hole 3. Then, as mentioned above, when the inner sleeve 21 makes the coned disc spring 25 be in the fully compressed state, the outer sleeve 31 comes into strong and close contact with the socket hole 3, and the outer sleeve 31 strongly presses the movable block 2 to the reference block 1.

Simultaneously with those operations of the first plug means 11 and the second plug means 12, the two third plug means 13, 13, which have only the locking function, strongly fix the work pallet 2 to the reference block 1 via the outer sleeve 31.

When switching from the locked state to the released state, as described above, it is only required to discharge the pressurized oil in the lock chamber 53 and to supply pressurized oil to the release chamber. Thereby, the piston 38 makes the outer sleeve 31 ascend via the output rod 41, and the outer sleeve 31 diametrically contracts by its own elastic restoring force, by which the locked state is canceled.

Figure 6:
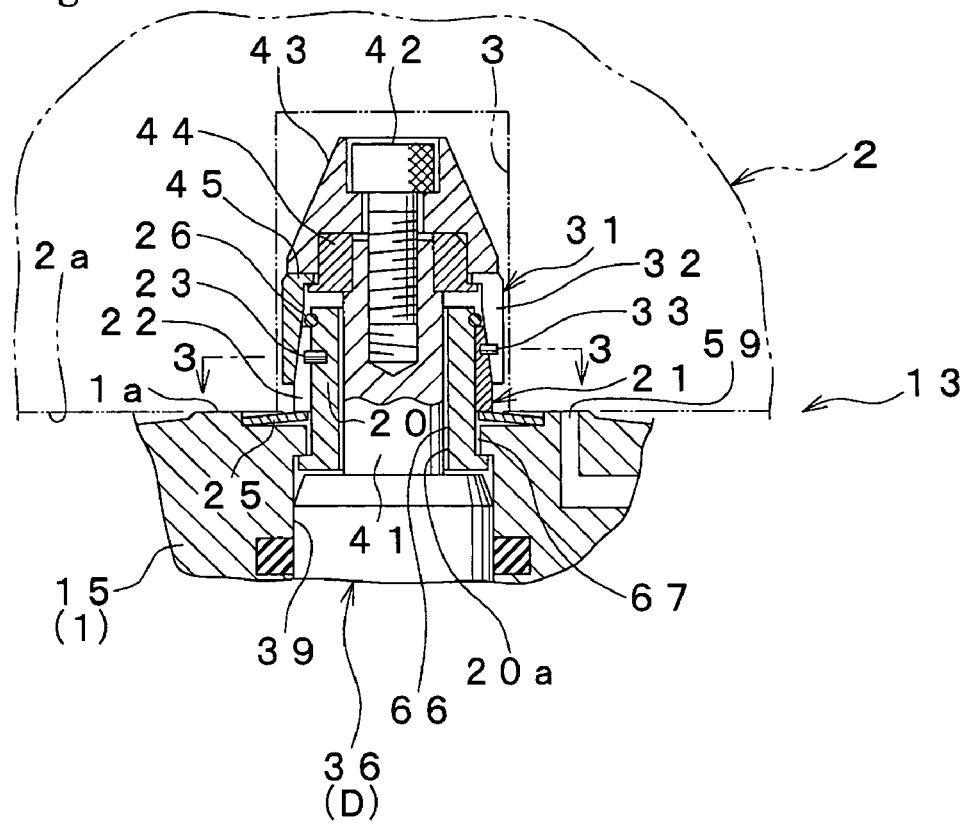
FIG. 6 is a view similar to FIG. 5A, illustrating an exemplified variation of the another clamping apparatus.

It is noted that the third plug means 13 may employ a structure shown in an exemplified variation illustrated in FIG. 6, in place of the axial gap absorption structure shown in FIG. 5A and FIG. 5B.

FIG. 6 is a view similar to FIG. 5A, wherein the central pillar 20 is supported on the housing 15 radially movably. In detail, between an outer peripheral surface of the output rod 41 and the cylindrical hole 20a of the central pillar 20 is formed a first radial clearance 66, and between the outer peripheral surface of the central pillar 20 and the housing 15 is formed a second radial clearance 67.

The first embodiment and the exemplified variation can be changed as follows.

An outer surface of the outer sleeve 31 may be formed in a serrated or irregular manner instead of being formed in a vertically straight manner.

The inner sleeve 21 and the outer sleeve 31, which are diametrically expandable and contractible, may be provided with a plurality of through grooves opened in the respective annular wall thereof in such a manner that the through grooves are opened alternately in an upper and lower surface, instead of being provided with a slit 22, 32 in the respective annular wall. It is also possible that each of the sleeves 21, 31 is composed of a plurality of divided members arranged circumferentially.

The outer surface of the inner sleeve 21 may be composed of a plurality of inclined wedge surfaces arranged circumferentially at predetermined intervals, instead of the tapered surface presented as an example. In this case, a plurality of inclined grooves may be arranged circumferentially at predetermined intervals on the outer surface of the inner sleeve 21, and the bottom walls of the inclined grooves form the inclined wedge surfaces. In addition, the inner surface of the outer sleeve 31 may be also composed of a plurality of inclined wedge surfaces arranged circumferentially at predetermined intervals, instead of the tapered surface presented as an example.

The inner sleeve 21 and the outer sleeve 31 may make an indirect engagement with each other via another member, instead of making a direct engagement.

It is noted that, it is preferable that each of the plug means 11, 12, 13 are provided with a cleaning means to clean the contact portion between the supporting surface 1a and the supported surface 2a, the engaged portion between the socket hole 3 and the outer sleeve 31, and the engaged surface between the outer sleeve 31 and the inner sleeve 21 and the like, using pressurized fluid such as compressed air.

In addition, in regard to the second plug means 12 shown in FIG. 4 and the third plug means 13 shown in FIG. 5A and FIG. 5B (or FIG. 6), it is preferable that the coned disk spring 25 is arranged in such a manner that, at the beginning of the locking movement, the urging force of the coned disc spring 25, which acts relative to the inner sleeve 21, is set weak or is set in such a manner that the urging force does not act at all relative to the inner sleeve 21, at the middle of the locking movement, the urging force gradually acts relative to the inner sleeve 21. Thereby, when the axial gap between the axis of the socket hole 3 and the axis of the central pillar 20 is absorbed, a radial frictional force, which acts relative to the inner sleeve 21 (or the radially movable central pillar 20 and the inner sleeve 21, both shown in FIG. 6), remains weak, by which both the inner sleeve 21 and the outer sleeve 31 can radially move smoothly.

FIG. 7A through FIG. 25 show a plurality of embodiments and exemplified variations relating to the present invention. In these other embodiments, components similar to those of the first embodiment will be designated and described by the same numerals as a general rule.

Figure 7B:
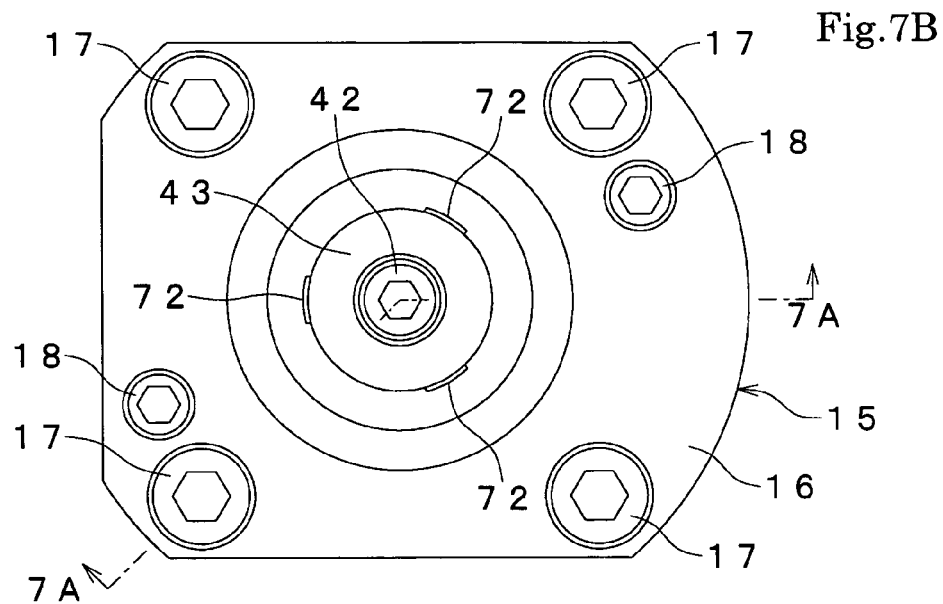
FIG. 7B is a plan view of the clamping apparatus, similar to FIG. 2B.
Figure 7A:
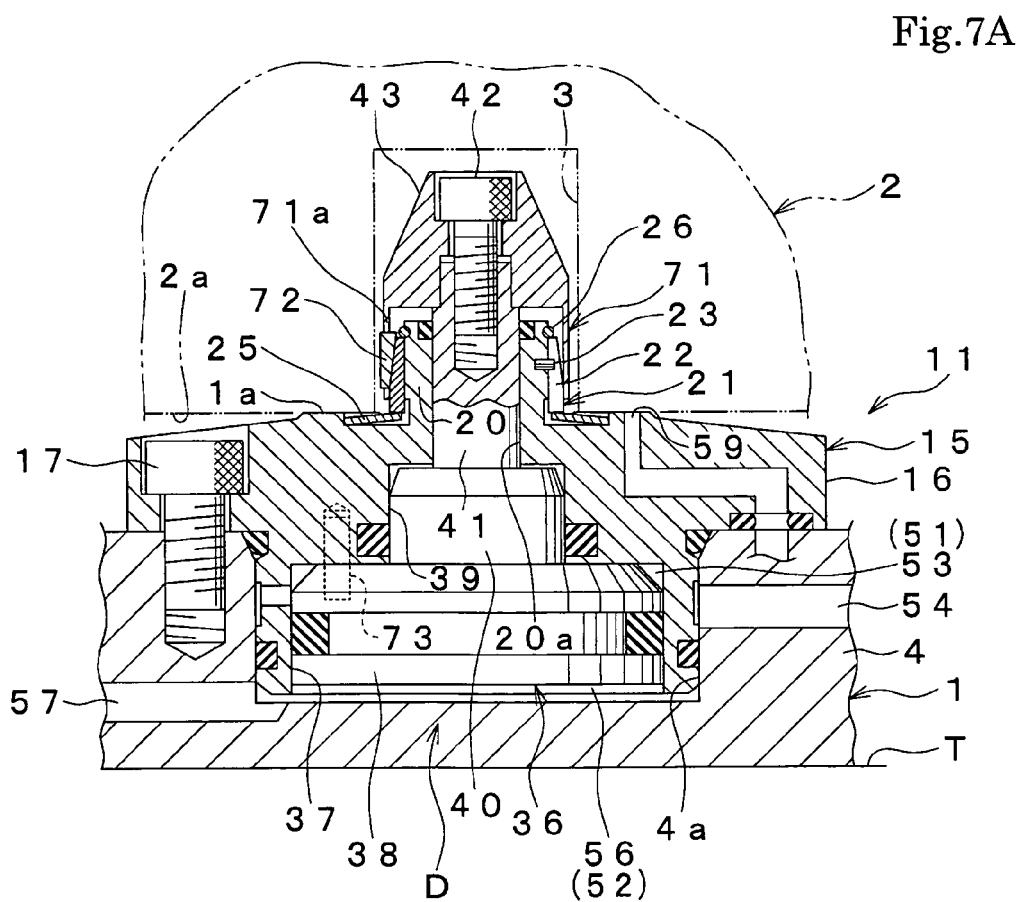
Figure 8:
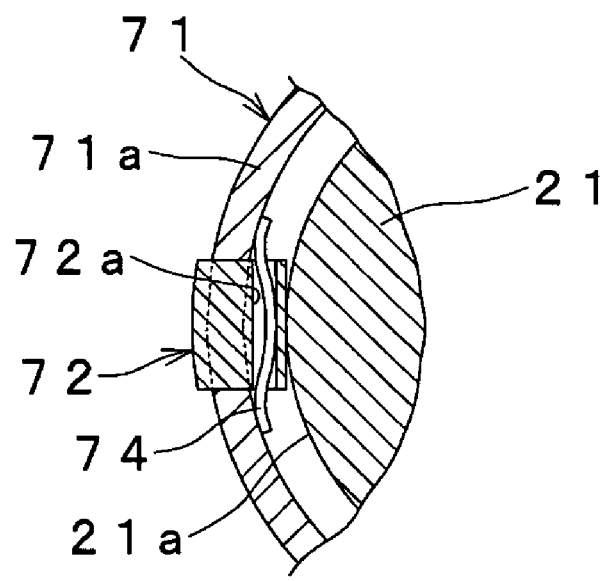

FIG. 7A and FIG. 7B, and FIG. 8 show a first plug means (a clamping apparatus) 11 of a second embodiment according to the present invention. FIG. 7A is a view similar to FIG. 2A, corresponding to a view indicated by the arrow 7A-7A in FIG. 7B. FIG. 7B is a plan view of the first plug means 11, similar to FIG. 2B. FIG. 8 is an enlarged horizontal sectional view of a main portion in FIG. 7A.

The first plug means 11 of the second embodiment is different from the first embodiment in the following points.

In place of the outer sleeve 31, which is diametrically expandable and contractible as shown in FIG. 2A, an annular plug 71 to be inserted into the socket hole 3 is arranged on an outer periphery of the inner sleeve 21. A peripheral wall 71a of the annular plug 71 is formed in a circumferentially seamless manner without any slit. Three pressing members 72 are supported on the peripheral wall 71a of the annular plug 71 and arranged circumferentially at intervals. An inner surface of each of the pressing members 72 makes a wedge engagement with the outer surface of the inner sleeve 21 from above. Each of the pressing members 72 is movable radially inward by a restoring means 74 (see FIG. 8). An upper end portion (a leading end portion) of the output member 36 is fixed to the annular plug 71 via the cap 43.

It is noted that the output member 36 is blocked from rotating by a pin 73 inserted into the piston 38.

The restoring means 74 shown in FIG. 8 is composed of a rod-shaped spring fitted between the annular plug 71 and a through hole 72a of each of the pressing members 72. The spring restoring means 74 urges the pressing members 72 toward the outer peripheral surface of the inner sleeve 21.

Figure 9:
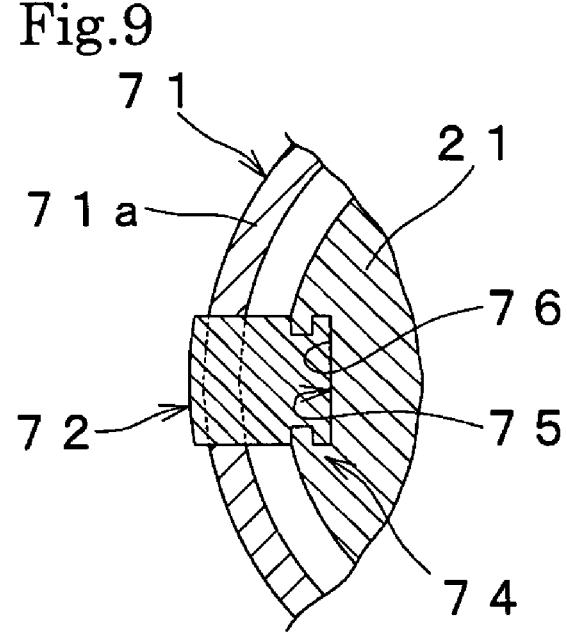
FIG. 9 is a view similar to FIG. 8, illustrating an exemplified variation of the restoring means.

FIG. 9 is a view similar to FIG. 8, showing an exemplified variation of the restoring means 74.

In this case, on the outer peripheral surface of the inner sleeve 21 are provided a plurality of inclined grooves 75 circumferentially at intervals, and each of the inclined grooves 75 are formed into a T shape in a plan view, the restoring means 74 is formed by a fitting structure between both side walls of each of the inclined grooves 75 and an inner end portion of each of the pressing members 72. On a bottom wall of each of the inclined groove 75 is formed a wedge surface 76.

It is noted that each of the inclined grooves 75 may be formed into a V shape or the like in the plan view, instead of being formed into the T shape as mentioned above.

Differences between the operation of the second embodiment and the operation of the first embodiment is that, during the locking operation, each of the pressing members 72 supported on the annular plug 71 are projected out radially outward, and an outer surface of each of the pressing member 72 comes into strong and close contact with the socket hole 3.

Each of the pressing members 72 may make an indirect engagement with the outer surface of the inner sleeve 21 via another member, instead of making a direct engagement. The number of the pressing members 72 provided may be two or four or more, instead of being three presented as an example.

In addition, the outer surface of each of the pressing members 72 may be formed into a serrated or irregular manner, instead of being formed into a vertically straight manner.

It is preferable that a supply port for a cleaning fluid is provided in the reference block 1, and discharge ports for the cleaning fluid is formed by a fitting gap between the peripheral wall 71a of the annular plug 71 and the pressing members 72, and that the discharge port communicates with the supply port. In this case, the fitting gap can be automatically cleaned, by which the pressing members 72 move with high accuracy and smoothly.

The advancing means may be a plurality of coned disc springs laminated vertically or may be a compression coil spring, rubber and the like, instead of the one coned disc spring 25 presented as an example.

Figure 10:
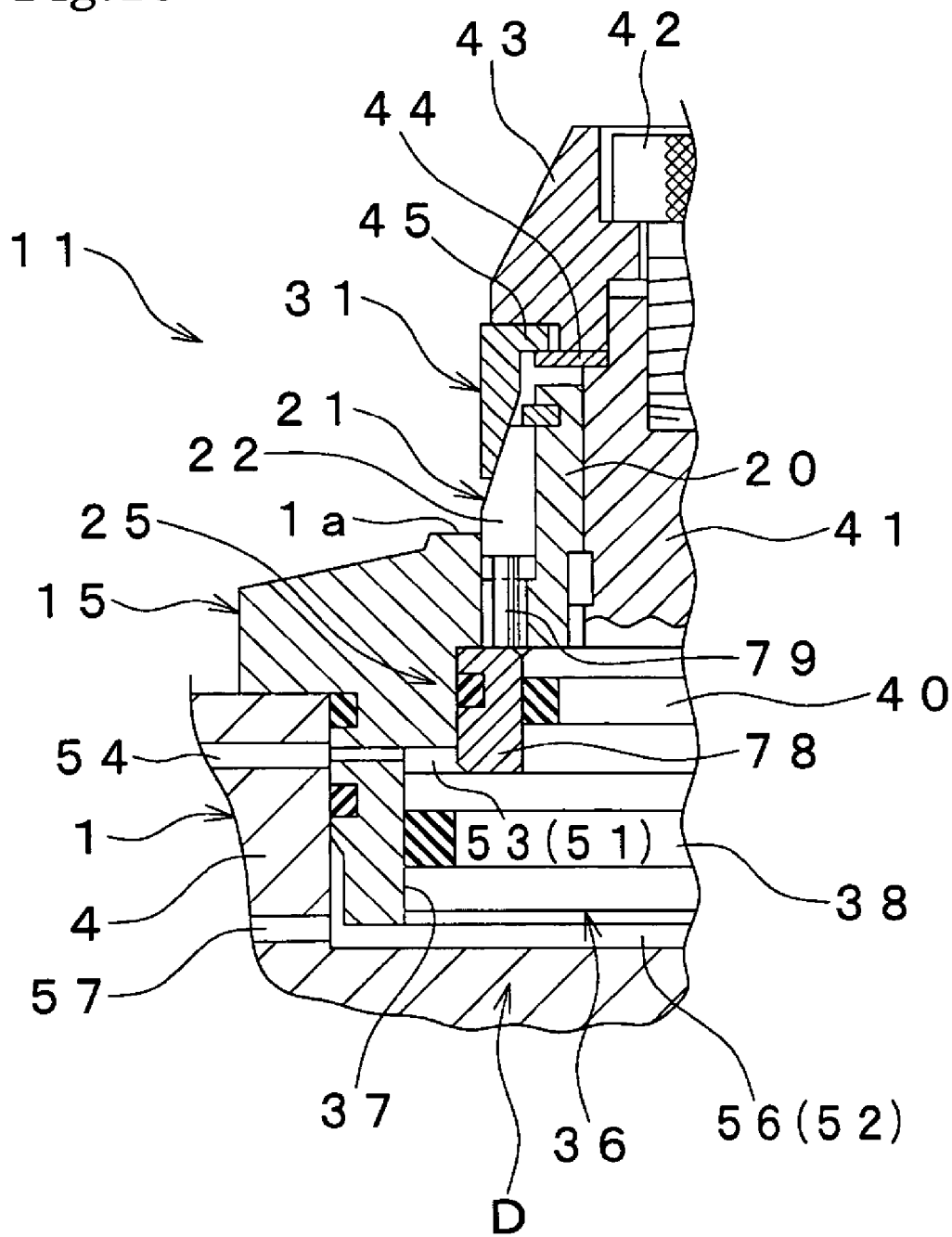
FIG. 10 is a partial view similar to FIG. 2A, illustrating an exemplified variation of an advancing means provided in the various types of clamping apparatuses.

In addition, it is sufficient that the advancing means has a function that can press the outer sleeve 31 upward with a predetermined force, that is, the advancing means can employ a cylindrical structure using pressurized fluid such as pressurized oil and compressed air as shown in the exemplified variation shown in FIG. 10 for example, instead of (or in addition to) employing an elastic member such as the spring 25.

FIG. 10 is a partial view similar to FIG. 2A. In this case, an annular advancing piston 78 is fitted onto an outer periphery of the piston rod 40 of the output member 36, and a pressure receiving area of the advancing piston 78 is set to a value smaller than a pressure receiving area of the piston 38. And the pressure of the pressurized oil supplied to the lock chamber 53 is adapted to press the outer sleeve 31 upward via the advancing piston 78, a plurality of connecting rods 79 (only one connecting rod is illustrated herein) and the inner sleeve 21 in the recited order.

Figure 11:
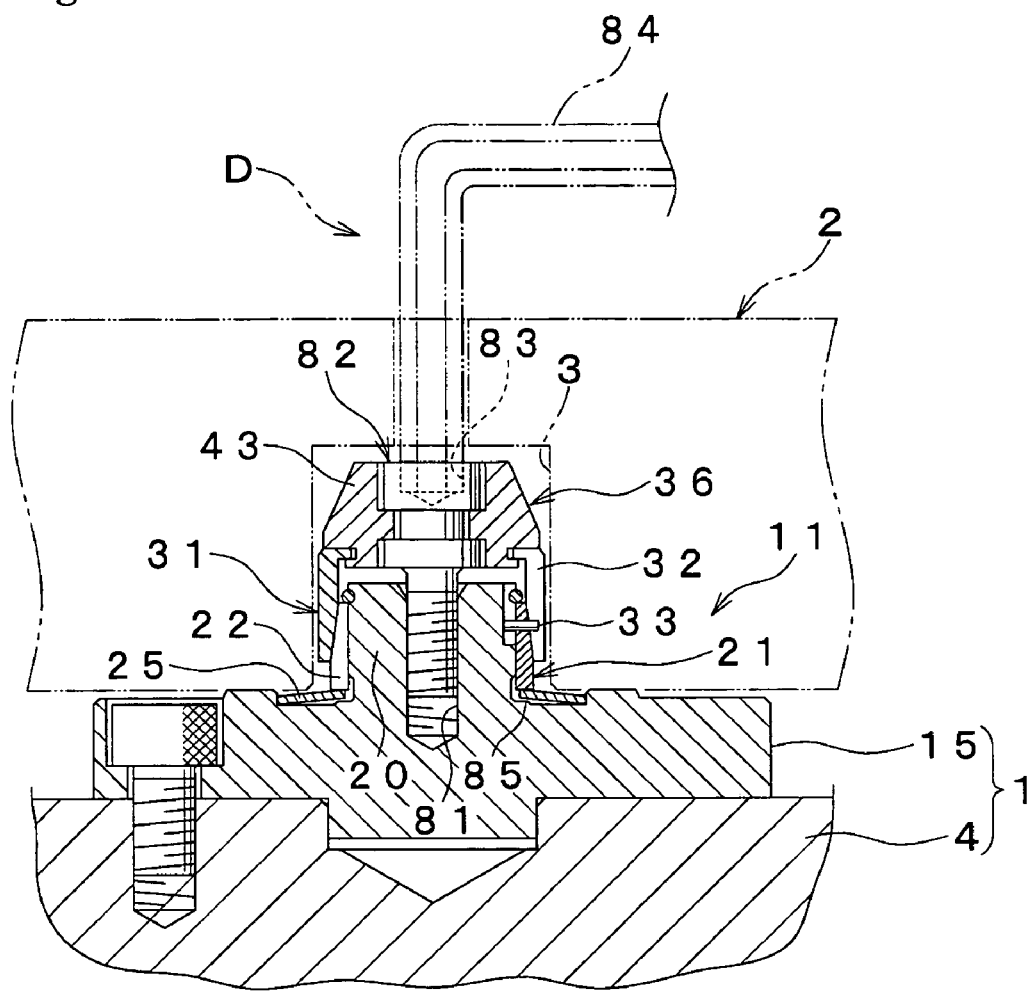
FIG. 11 is a view similar to FIG. 2A, illustrating a clamping apparatus of a third embodiment according to the present invention.

FIG. 11 is a view similar to FIG. 2A, showing a first plug means 11 of a third embodiment according to the present invention.

In this case, the driving means D employs a human-powered type. In detail, the output member 36 is provided with a bolt 82 screwed in a screw hole 81 of the central pillar 20. During the locking operation, a hexagonal wrench 84 is inserted into an input hole (an input portion) 83 at a head portion of the bolt 82, and the bolt 82 is rotated clockwise in a plan view. Then, the head portion of the bolt 82 makes the outer sleeve 31 descend via the cap (the output portion) 43 with the outer sleeve 31 diametrically expanded.

It is noted that the coned disc spring (the advancing means) 25 is prevented from being compressed more than a predetermined amount by an annular projection 85 provided around a lower portion of the central pillar 20. It is preferable that this kind of projection 85 is also provided in the above-described respective embodiment and respective embodiment described later.

Figure 12B:
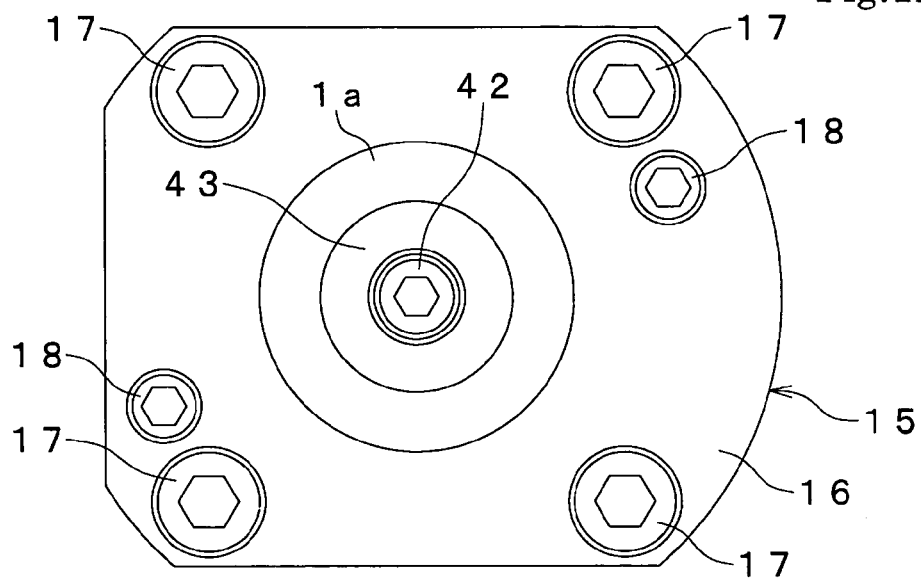
FIG. 12B is a view similar to FIG. 2B.
Figure 12A:
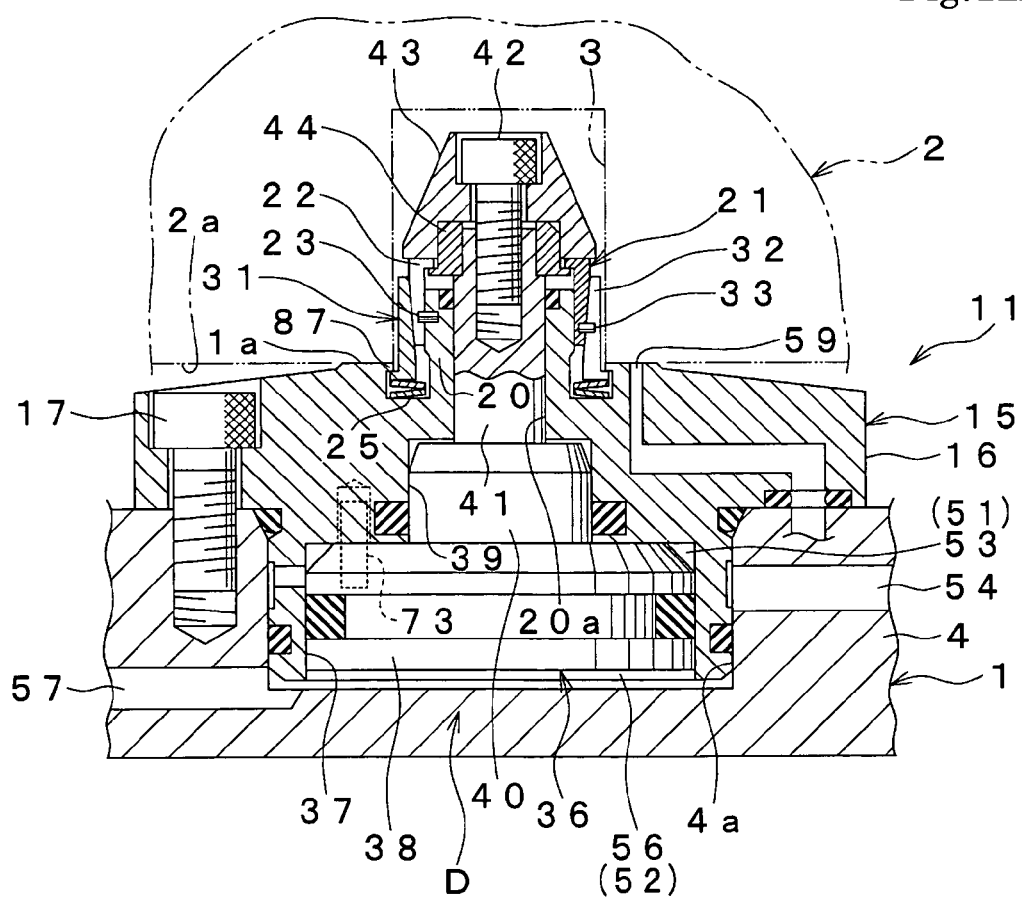
Figure 13:
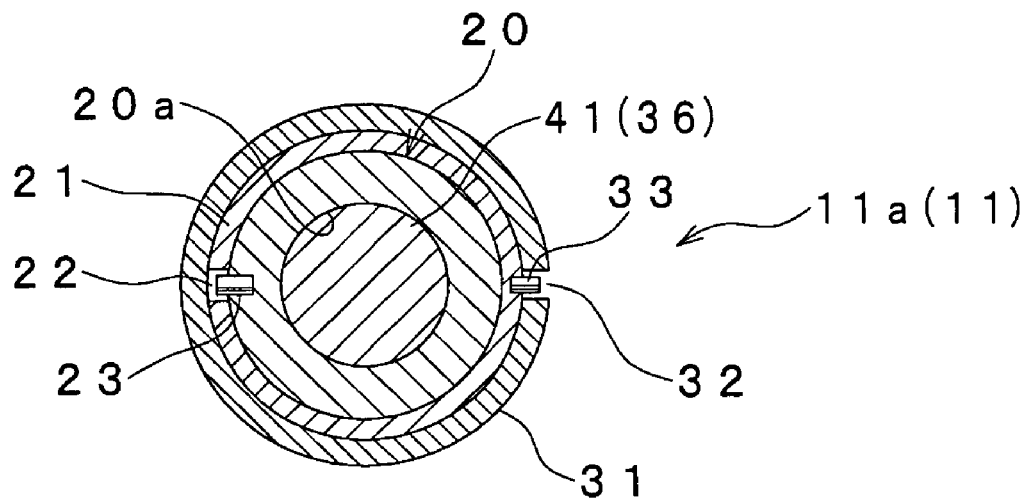

FIG. 12A and FIG. 12B, and FIG. 13 show a first plug means 11 of a fourth embodiment according to the present invention. FIG. 12A is a view similar to FIG. 2A. FIG. 12B is a view similar to FIG. 2B. FIG. 13 is a view similar to FIG. 3, showing the positioning mechanism 11a.

In this case, between the cap 43 and the ring 44 is supported an upper portion of the inner sleeve 21 radially movably, and the outer sleeve 31 makes a wedge engagement with the inner sleeve 21 from below, and the outer sleeve 31 is urged upward by a plurality of the coned disc springs 25. The outer sleeve 31 is blocked from moving upward by more than a predetermined amount by an annular holding wall 87.

Figure 14:
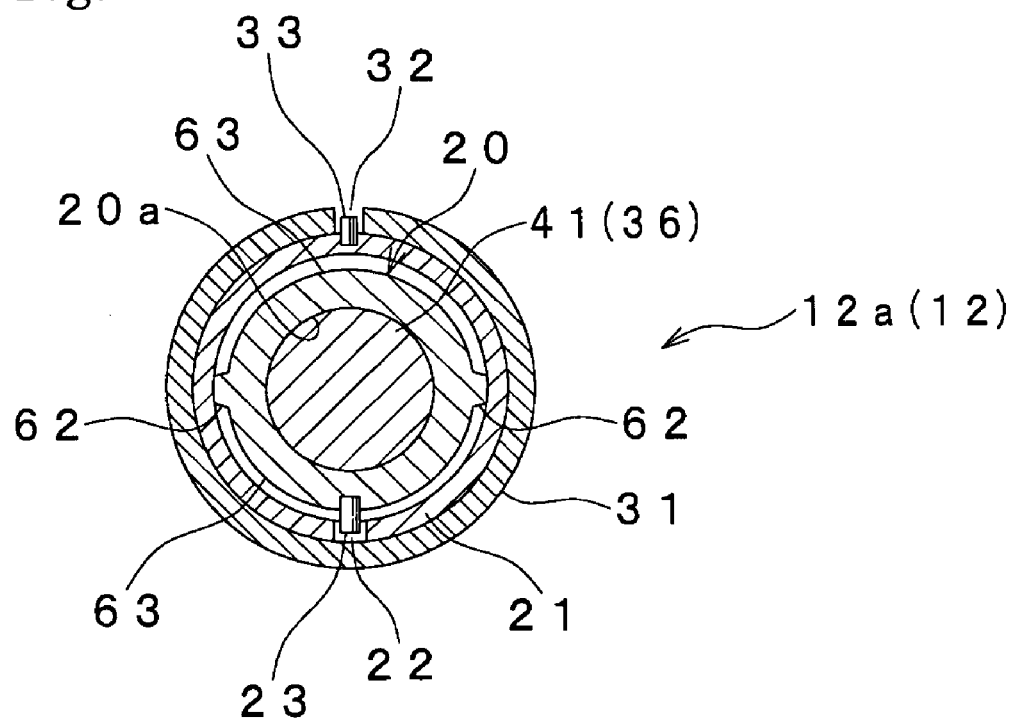

It is noted that FIG. 14 is a view similar to FIG. 4, showing another positioning mechanism 12a.

Figure 15B:
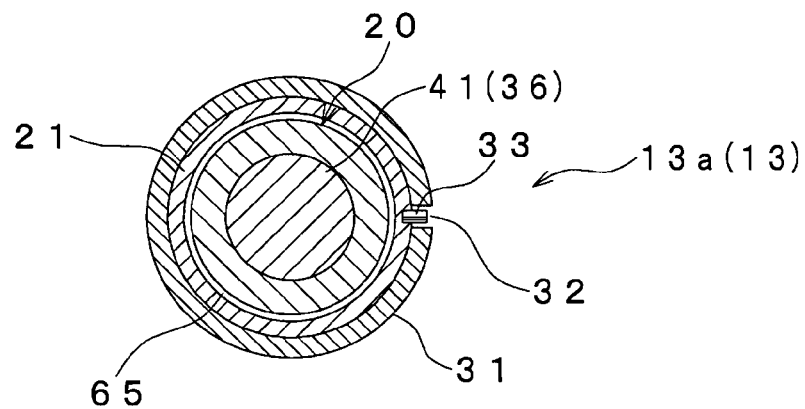
Figure 15A:
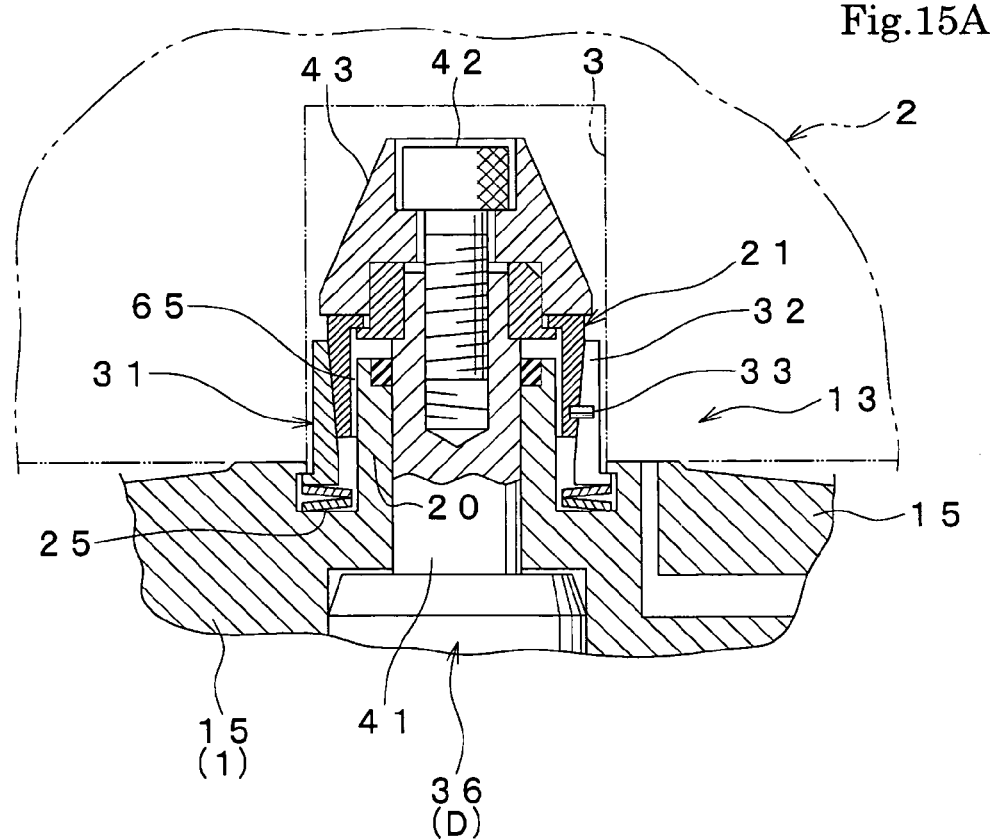

FIG. 15A and FIG. 15B show a third plug means 13 of the fourth embodiment. FIG. 15A is a view similar to FIG. 5A, and FIG. 15B is a view similar to FIG. 5B.

In this case, the peripheral wall of the inner sleeve 21 is formed in a circumferentially seamless manner without any slit. The inner sleeve 21 is fitted onto the central pillar 20 with a radial clearance 65 spaced radially movably, and on the cap 43 is supported an upper portion of the inner sleeve 21 radially movably. In addition, a lower portion of the outer sleeve 31 is supported on the housing 15 radially movably. Thereby, the inner sleeve 21 and the outer sleeve 31 are allowed to move radially relative to the central pillar 20, by which the axial gap between the axis of the socket hole 3 and the axis of the central pillar 20 can be absorbed.

Figure 16:
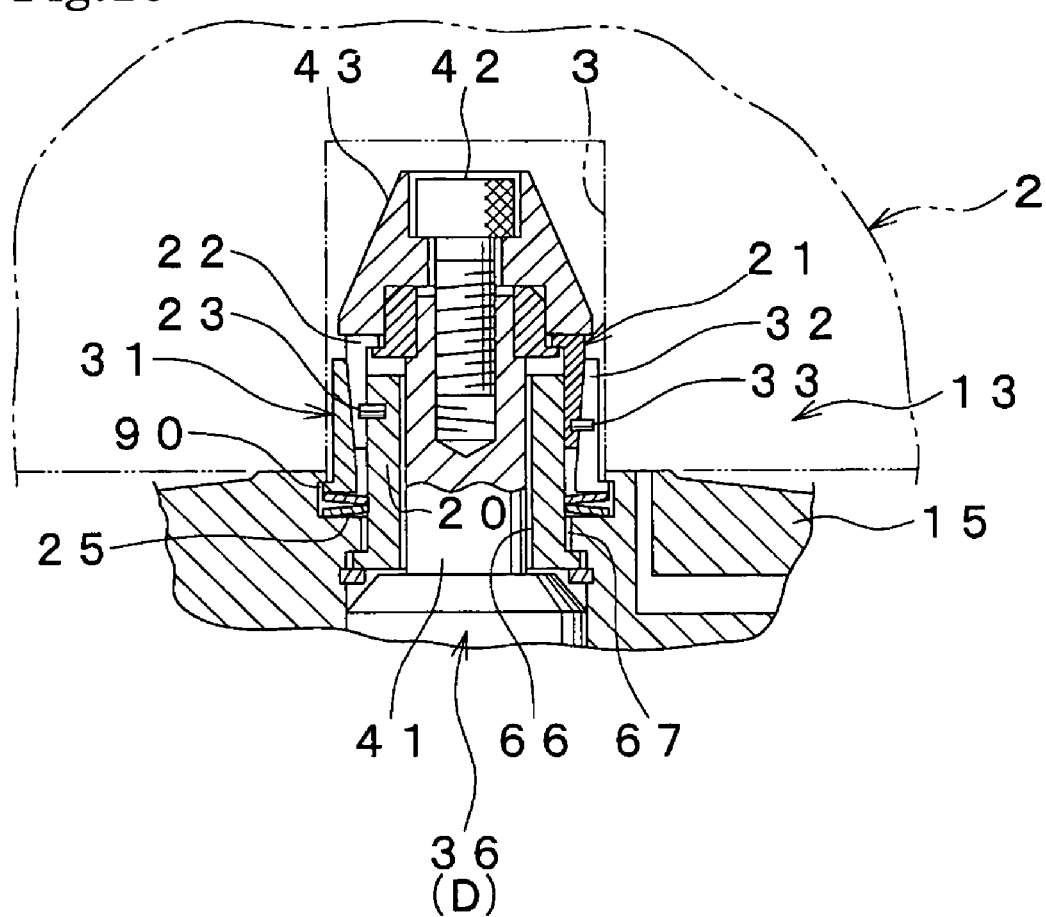
FIG. 16 is a view similar to FIG. 6, illustrating an exemplified variation of the another clamping apparatus.

FIG. 16 is similar to FIG. 6, showing an exemplified variation of the third plug means 13.

In the exemplified variation shown in FIG. 16, the central pillar 20 is supported on the housing 15 radially movably. In detail, a first radial clearance 66 is formed between the outer peripheral surface of the output rod 41 and the cylindrical hole of the central pillar 20, and a second radial clearance 67 is formed between the outer peripheral surface of the central pillar 20 and the housing 15, and a third radial clearance 90 is formed between the lower portion of the outer sleeve 31 and the housing 15.

Figure 17B:
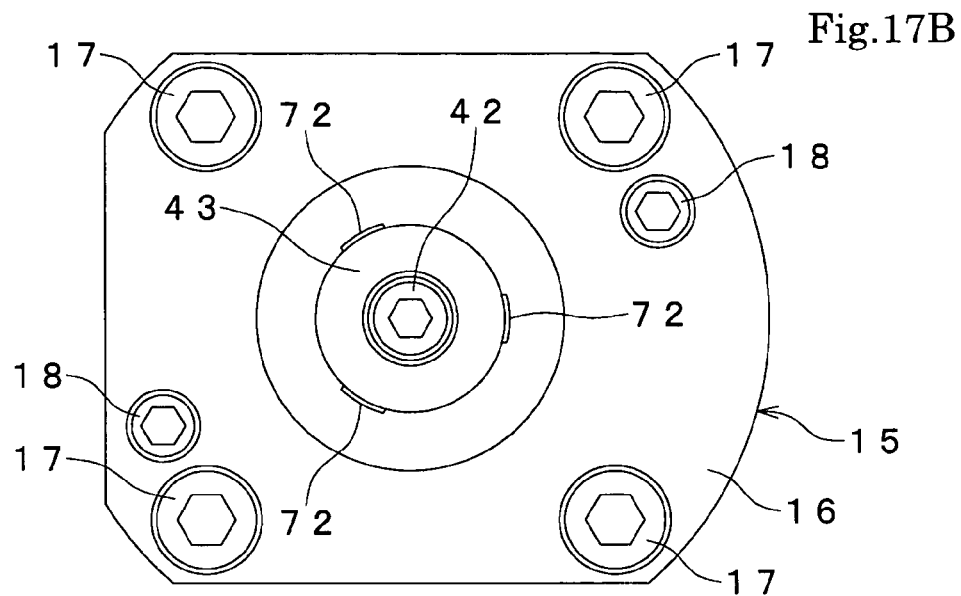
Figure 17A:
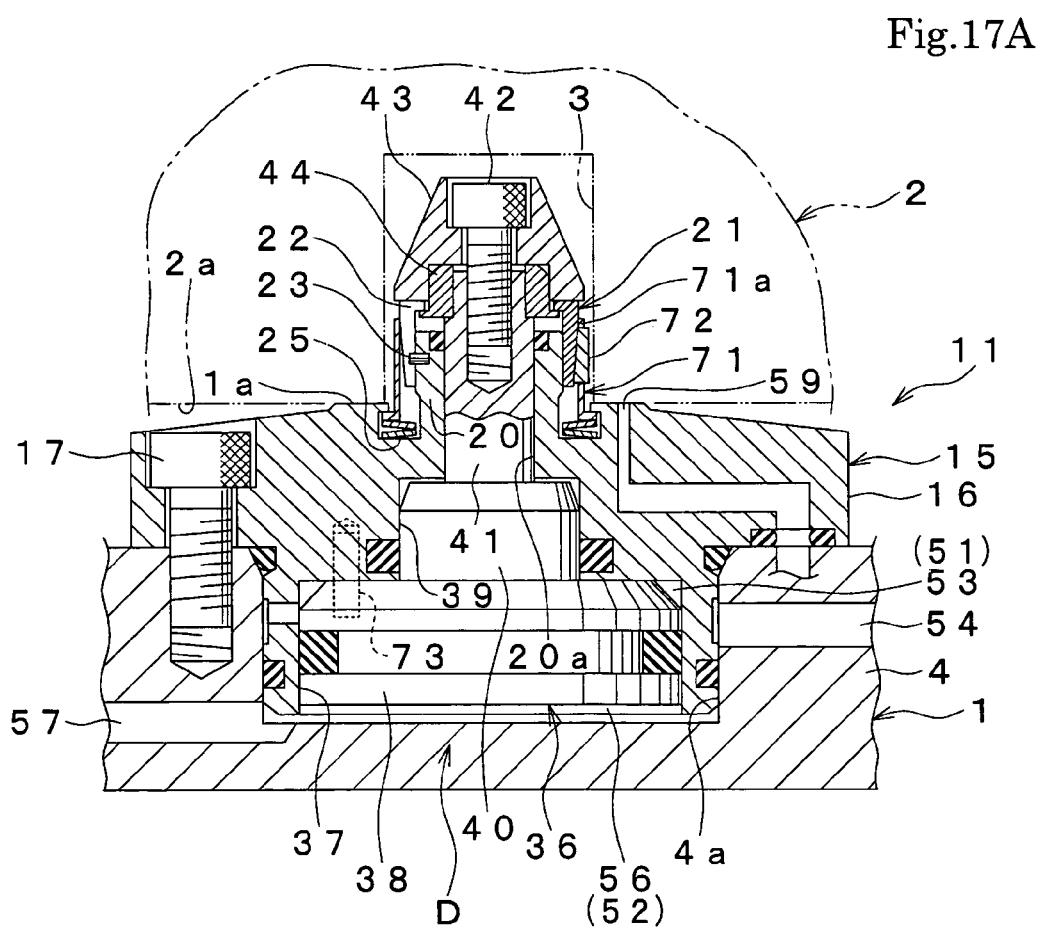

FIG. 17A and FIG. 17B show a first plug means 11 of a fifth embodiment according to the present invention. FIG. 17A is a view similar to FIG. 7A. FIG. 17B is a view similar to FIG. 7B.

In this case, the upper portion of the inner sleeve 21 is supported on the cap 43 radially movably, and the annular plug 71 is arranged on the outer periphery of the inner sleeve 21. The annular plug 71 is urged upward by a plurality of the coned disc springs 25, and a plurality of the pressing members 72 supported on the annular plug 71 make a wedge engagement with the inner sleeve 21 from below.

Figure 18B:
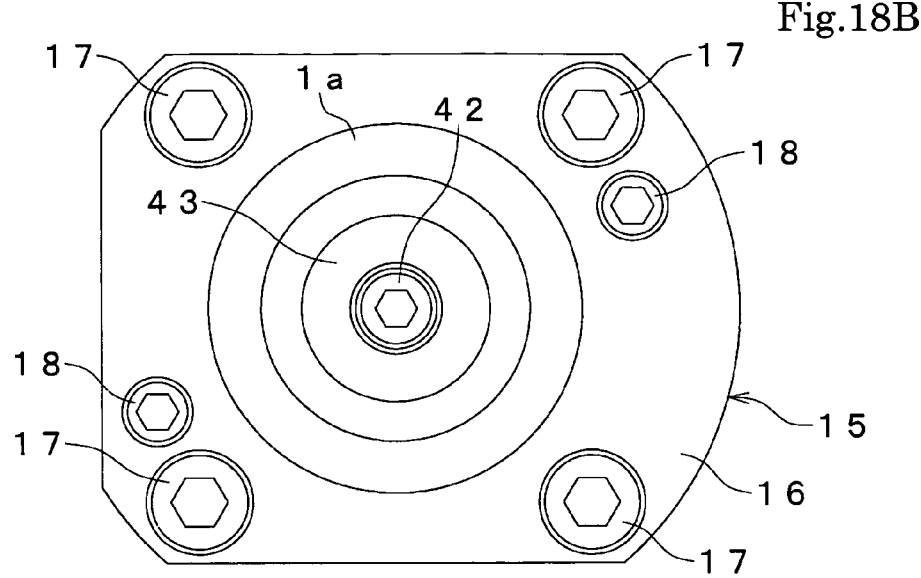
FIG. 18B is a view similar to FIG. 2B.
Figure 18A:
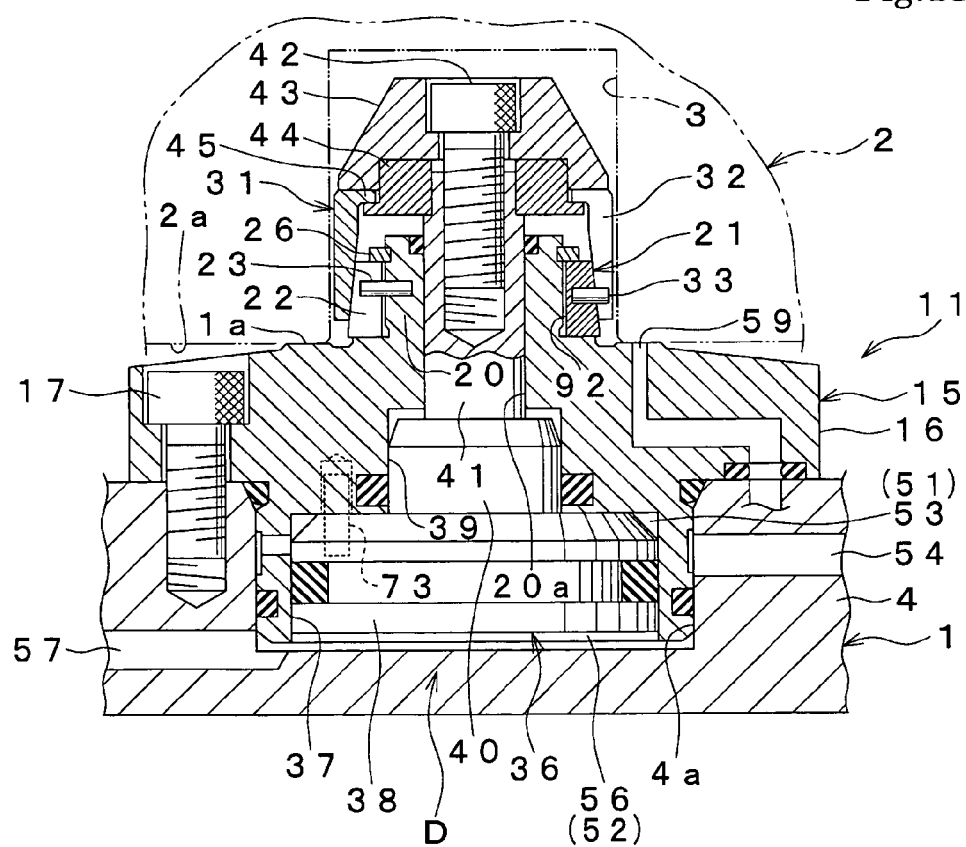
Figure 19A:
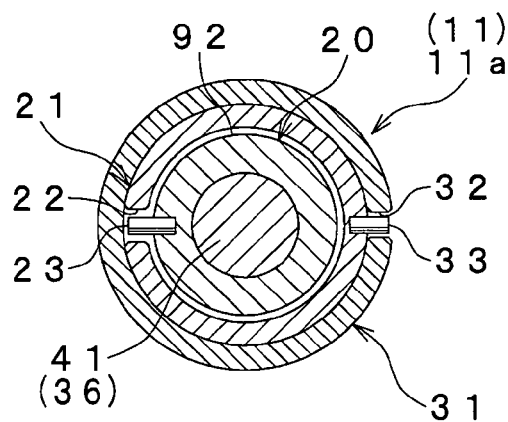
FIG. 19A is a view similar to FIG. 3, illustrating a released state of a positioning mechanism provided in the clamping apparatus.
Figure 19B:
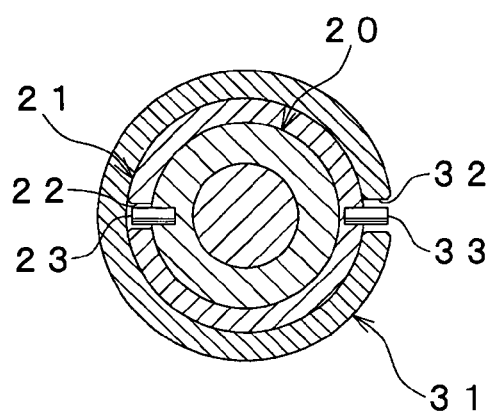
FIG. 19B is a view similar to FIG. 19A, illustrating a locked state of the positioning mechanism.

FIG. 18A through FIG. 19B show a first plug means 11 of a sixth embodiment according to the present invention. FIG. 18A is a view similar to FIG. 2A. FIG. 18B is a view similar to FIG. 2B. FIG. 19A is a view similar to FIG. 3, showing a released state of a positioning mechanism 11a. FIG. 19B is a view similar to FIG. 19A, showing a locked state of the mechanism 11a.

In the sixth embodiment, the slit 22 is provided in the peripheral wall of the inner sleeve 21, by which the inner sleeve 21 is diametrically expandable and contractible, and between the central pillar 20 and the inner sleeve 21 is formed a comparatively large annular clearance 92. In the released state, as shown in FIG. 19A, the inner sleeve 21 is kept in a slightly diametrically expanded state. Then, during the locking movement, as shown in FIG. 19B, the outer sleeve 31 diametrically contracts the inner sleeve 21, and simultaneously, the outer sleeve 31 descends while diametrically expanding.

It is noted that an elastic resistant force that occurs when the inner sleeve 21 is diametrically contracted corresponds to the urging force of the coned disc spring (the advancing means).

Figure 20A:
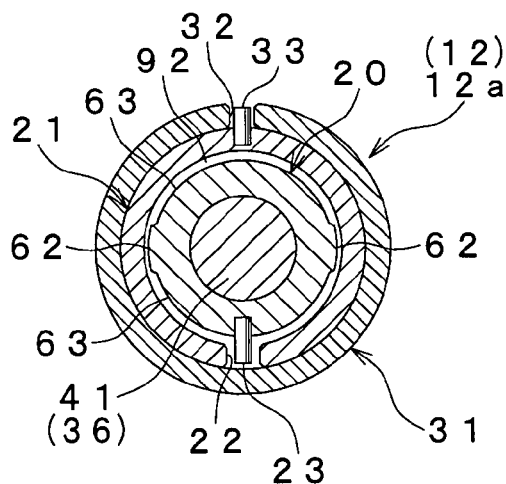
FIG. 20A is a view similar to FIG. 4, illustrating a released state of another positioning mechanism provided in the clamping apparatus.
Figure 20B:
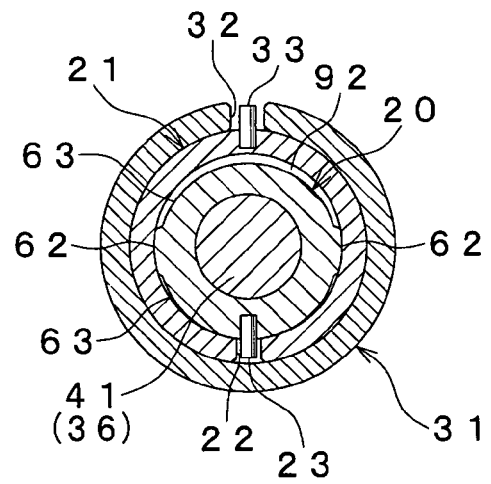
FIG. 20B is a view similar to FIG. 20A, illustrating a locked state of the another positioning mechanism.

FIG. 20A and FIG. 20B show another positioning mechanism 12a. FIG. 20A is a view similar to FIG. 4, showing a released state. FIG. 20B is a view similar to FIG. 20A, showing a locked state. The another positioning mechanism 12a is different from the positioning mechanism 11a in that the projecting portions 62, 62 and escape grooves 63, 63 are provided on the outer peripheral surface of the central pillar 20.

Figure 21B:
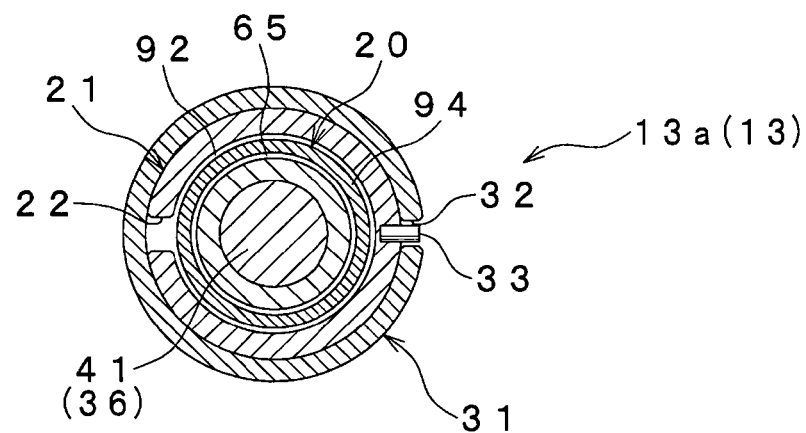
Figure 21A:
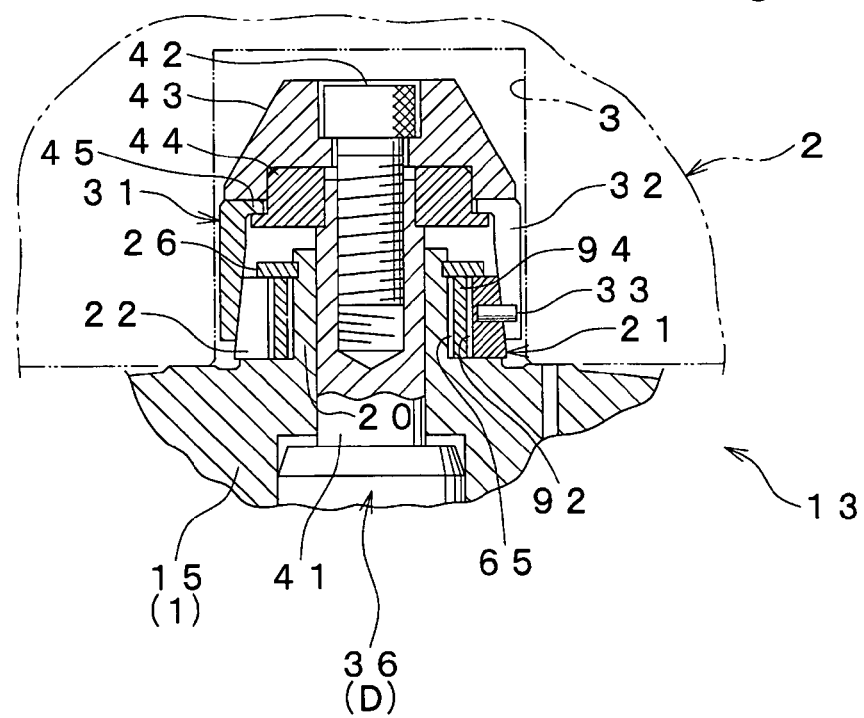

FIG. 21A and FIG. 21B show a third plug means 13 of the sixth embodiment. FIG. 21A is a view similar to FIG. 5A. FIG. 21B is a view similar to FIG. 5B.

In this case, to the outer periphery of the central pillar 20 is inserted an intermediate sleeve 94 radially movably, and to an outer periphery of the intermediate sleeve 94 is inserted the inner sleeve 21 with the annular clearance 92 spaced, and the outer sleeve 31 makes a wedge engagement with the inner sleeve 21 from above.

Figure 22:
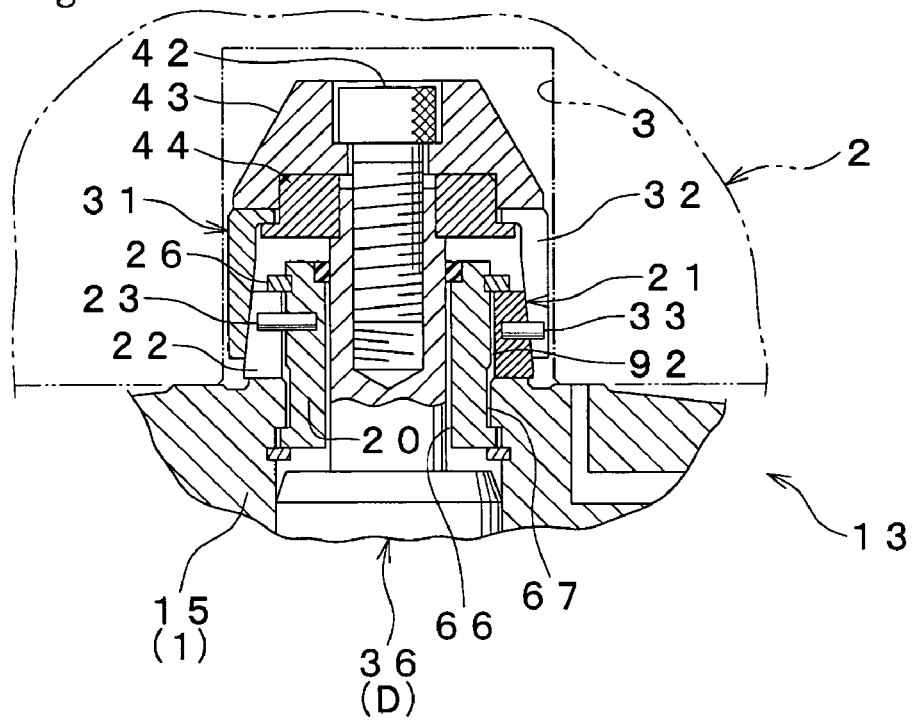
FIG. 22 is a view similar to FIG. 6, illustrating an exemplified variation of the another clamping apparatus.

FIG. 22 is a view similar to FIG. 6, showing an exemplified variation of the third plug means 13. The structure of this exemplified variation is different from the structure shown in FIG. 6 in that, between the central pillar 20 that is radially movable and the inner sleeve 21 is provided a comparatively large annular clearance 92, and the coned disc spring (the advancing means) 25 shown in FIG. 6 is omitted.

Figure 23:
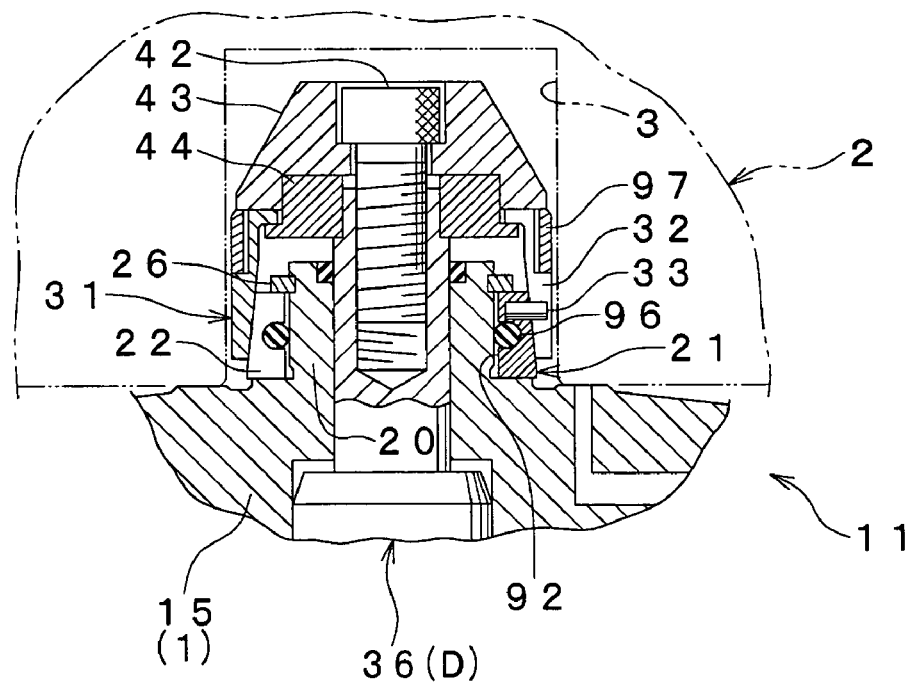
FIG. 23 is a partial view similar to FIG. 18A, illustrating a different mode of the clamping apparatus of the sixth embodiment.

FIG. 23 is a partial view similar to FIG. 18A, showing a different mode of the first plug means 11 of the sixth embodiment.

In this case, a resistant means 96 made of a rubber ring is attached to the inner periphery of the inner sleeve 21. This resistant means 96 is adapted to increase a resistant force that occurs when the inner sleeve 21 is diametrically contracted.

It is noted that the resistant means 96 can be made of plastic or metal, instead of being made of rubber presented as an example. In addition, the resistant means 96 may be attached to the outer periphery of the central pillar 20, instead of (or in addition to) being attached to the inner periphery of the inner sleeve 21.

In addition, a protection sleeve 97 is attached to an upper half of the outer sleeve 31 radially movably. The protection sleeve 97 covers an upper half of the slit 32, by which foreign matter such as swarf can be significantly prevented from entering the slit 32. It is a matter of course that the protection sleeve 97 is applicable to the above-described respective clamping apparatuses.

Figure 24:
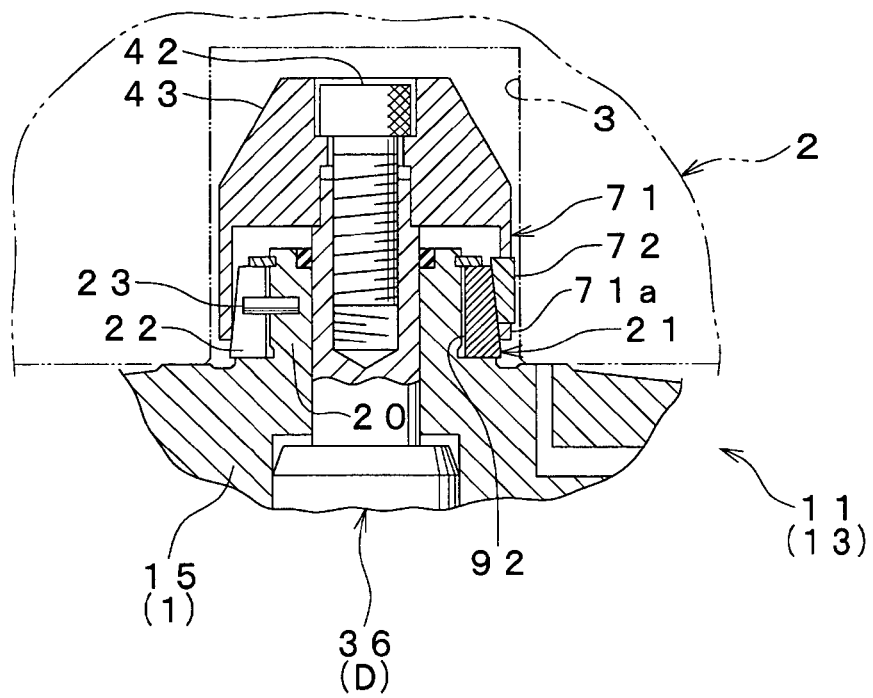
FIG. 24 is a partial view similar to FIG. 7A, illustrating a clamping apparatus of a seventh embodiment according to the present invention.

FIG. 24 is a partial view similar to FIG. 7A, showing a first plug means 11 of a seventh embodiment according to the present invention.

The structure of the seventh embodiment is different from the structure shown in FIG. 7A in that the annular clearance 92 is provided between the central pillar 20 and the inner sleeve 21, and that the coned disc spring (the advancing means) 25 shown in FIG. 7A is omitted.

Figure 25:
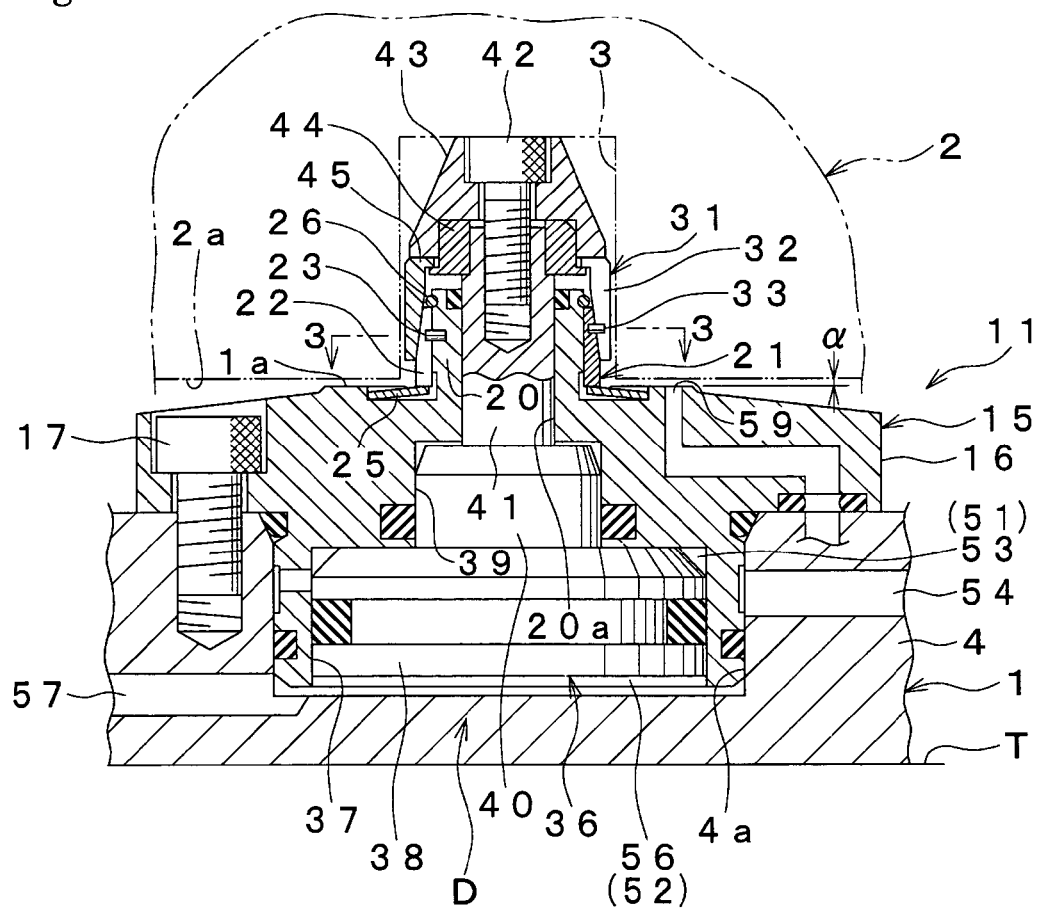
FIG. 25 is a view similar to FIG. 2A, illustrating a clamping apparatus of an eighth embodiment according to the present invention.

FIG. 25 is a view similar to FIG. 2A, showing a clamping apparatus of an eighth embodiment according to the present invention. The structure of the eighth embodiment is different from the structure shown in FIG. 2A as follows.

In the illustrated state that the output member 36 has been moved upward for releasing, the work pallet 2 is received by the reference block 1 via at least one of the cap 43 and the connecting bolt 42 and via the output member 36, in the recited order. In the received state, a seating gap alpha is formed between the supporting surface 1a of the reference block 1 and the supported surface 2a of the work pallet 2.

The above-described receiving structure exhibits the following advantages. When the work pallet 2 is mounted to the reference block 1, the supported surface 2a of the work pallet 2 can be prevented from colliding with the supporting surface 1a of the reference block 1 by the output member 36. Thereby, the supporting surface 1a can be prevented from being damaged. Therefore, the positioning function of the clamping apparatus can be kept excellent for a long time.

The receiving structure is applicable to the above-described respective embodiments and exemplified variations.

The above-described respective embodiments and respective exemplified variations can be further changed as follows.

With respect to the clamping system, the exemplified number of third plug means 13 having only the locking function is two, but alternatively a single third means 13 or three or more third means 13 may be provided. The structure of the third plug means 13 is not limited to the structure presented as an example, and the third plug means 13 may employ other types of clamps.

The exemplified driving method of the plug means 11, 12, 13 is the hydraulic double-acting one, but alternatively a spring-locking and hydraulic-releasing one or a hydraulic-locking and spring-releasing one may also be employed.

The pressurized fluid to be used for locking or releasing may employ gases such as compressed air, instead of employing the pressurized oil presented as an example. In addition, the cleaning pressurized fluid may employ gases such as nitrogen or liquid, instead of employing the compressed air.

In the case that the lowering force of the outer sleeve 31 or the pressing members 72 during the locking operation is set to a sufficiently large value, the third plug means 13 can be omitted.

With respect to this clamping system, it is also possible to provide a plurality of first plug means 11 and a plurality of second plug means 12. Furthermore, it is also possible that a plurality of the first plug means 11 are provided while the second plug means 12 is not provided, or that a plurality of the second plug means 12 are provided while the first plug means 11 is not provided.

It is possible that a plurality of the plug means are arranged circumferentially or linearly.

The supporting surface 1a may be provided on the base plate 4 instead of being provided on the upper surface of the flange 16 of the housing 15.

The central pillar 20 and the housing 15 may be formed separately instead of being formed integrally. In this case, the central pillar 20 is firmly fixed to the housing 15 by fastening with a bolt or by tightening with a screw.

In addition, the housing 15 and the base plate 4 may be formed integrally instead of being formed separately.

The combination of the reference block and the movable block may be a combination of a table of a machine tool and a work pallet, a combination of a work pallet and a jig base, a combination of a jig base and a work piece, or a combination of a working jig such as a welding jig and an article such as a work piece instead of the combination of the base plate 4 and the work pallet 2 presented as an example. In addition, the present invention is also applicable to positioning of a workpiece or tool, etc., of various kinds of processing machines such as laser processing machines and electric discharge processing machines.

Besides, it is a matter of course that the clamping apparatus of the present invention can be used alone, instead of using a plurality of the clamping apparatuses at the same time.

What is claimed is:

1. A clamping apparatus, comprising:

An annular central pillar (20) is projected from a reference block (1) toward a leading end, an inner sleeve (21) is fitted onto the central pillar (20) axially movably within a predetermined range, and the inner sleeve (21) is advanced toward the leading end by a predetermined advancing stroke by an advancing means (25), an outer sleeve (31) to be inserted into a socket hole (3) of a movable block (2) makes a wedge engagement with the inner sleeve (21) from the leading end side, and the outer sleeve (31) is configured to be diametrically expandable and contractible, an output member (36) is inserted into a cylindrical hole (20a) of the annular central pillar (20) axially movably, and a leading end portion of the output member (36) is firmly connected to the outer sleeve (31), a locking means (51) and a releasing means (52) are provided in the reference block (1), the locking means (51) moves the outer sleeve (31) toward a base end for locking via the output member (36), while the releasing means (52) moves the outer sleeve (31) toward the leading end for releasing via the output member (36).

2. The clamping apparatus as set forth in claim 1, wherein in place of the outer sleeve (31), which is diametrically expandable and contractible, an annular plug (71) to be inserted into the socket hole (3) is arranged on an outer periphery of the inner sleeve (21), a plurality of pressing members (72) are supported on a peripheral wall (71a) of the annular plug (71) radially movably and are arranged circumferentially at intervals, each of the pressing members (72) makes a wedge engagement with the inner sleeve (21) from the leading end side, and each of the pressing members (72) is movable radially inward by a restoring means (74), the leading end portion of the output member (36) is connected to the annular plug (71).

3. A clamping apparatus, comprising:

an annular central pillar (20) is projected from a reference block (1) toward a leading end, an inner engaging member (21) is arranged on an outer periphery of the central pillar (20), an outer engaging member (31, 72) to be inserted into a socket hole (3) of a movable block (2) is diametrically expandable and contractible, the outer engaging member (31, 72) makes a wedge engagement axially with the inner engaging member (21), and the outer engaging member (31, 72), which is in the wedge engaged state, is movable toward a base end and diametrically expandable for locking, an output member (36) is inserted into the annular central pillar (20) axially movably, and an output portion of the output member (36) is firmly connected to either the outer engaging member (31, 72) or the inner engaging member (21), an input portion of the output member (36) is connectable to a driving means (D).

4. The clamping apparatus as set forth in claim 1 or 3, wherein in a state that the output member (36) has moved toward the leading end for releasing, the movable block (2) is received by the reference block (1) via the output member (36), and a seating gap (alpha) is formed between a support surface (1a) of the reference block (1) and a supported surface (2a) of the movable block (2).

5. The clamping apparatus as set forth in claim 4, wherein the outer engaging member is composed of an annular outer sleeve (31).

6. The clamping apparatus as set forth in claim 4, wherein the outer engaging member is composed of a plurality of pressing members (72) arranged circumferentially at intervals, an annular plug (71) to be inserted into the socket hole (3) is arranged on an outer periphery of the inner engaging member (21), each of the pressing members (72) is supported on a peripheral wall (71a) of the annular plug (71) radially movably and is movable radially inward by a restoring means (74), the output portion of the output member (36) is connected to either the annular plug (71) or the inner engaging member (21).

7. The clamping apparatus as set forth in claim 5, wherein the inner engaging member (21) is attached to at least one of the central pillar (20) and the output member (36) radially movably.

8. A clamping system using the clamping apparatus as set forth in claim 1 or 5, wherein two of the socket holes (3) (3) are provided in the movable block (2) at a predetermined interval, a first plug means (11) and a second plug means (12) corresponding to the respective socket hole (3) (3) are provided in the reference block (1), each of the plug means (11) (12) has the central pillar (20), the inner sleeve or the inner engaging member (21) and the outer sleeve (31), the first plug means (11) is composed so that substantially an entire circumference of an inner peripheral surface of the inner sleeve or substantially an entire circumference of an inner peripheral surface of the inner engaging member (21) is configured to come into close contact with an outer peripheral surface of the central pillar (20), the second plug means (12) is provided with a pair of projecting portions (62) (62), which radially face each other, on at least one of an outer periphery of the central pillar (20), an inner or outer periphery of the inner sleeve or the inner engaging member (21) and an inner or outer periphery of the outer sleeve (31), while escape grooves (63) (63) are formed between these projecting portions (62) (62).

9. The clamping system as set forth in claim 8, wherein at least one other socket hole (3) is provided in the movable block (2), a third plug means (13) only for locking corresponding to said other socket hole (3) is provided in the reference block (1).

10. The clamping system as set forth in claim 9, wherein the third plug means (13) has the central pillar (20), the inner sleeve or the inner engaging member (21), and the outer sleeve (31), the central pillar (20) is fixed to the reference block (1), the inner sleeve or the inner engaging member (21) is attached to at least one of the central pillar (20) and the output member (36) radially movably.

11. The clamping system as set forth in claim 9, wherein the third plug means (13) has the central pillar (20), the inner sleeve or inner engaging member (21), and the outer sleeve (31), and the central pillar (20) is supported on the reference block (1) radially movably.

12. A clamping system using the clamping apparatus as set forth in claim 2 or 6, wherein
- two of the socket holes (3) (3) are provided in the movable block (2) at a predetermined interval,
- a first plug means (11) and a second plug means (12) corresponding to the respective socket hole (3) (3) are provided in the reference block (1),
- each of the plug means (11) (12) has the central pillar (20), the inner sleeve or the inner engaging member (21), the annular plug (71) and a plurality of the pressing members (72),
- the first plug means (11) is composed so that substantially an entire circumference of an inner peripheral surface of the inner sleeve or substantially an entire circumference of an inner peripheral surface of the inner engaging member (21) is configured to come into close contact with an outer peripheral surface of the central pillar (20), and three or more of the pressing members (72) are arranged circumferentially at intervals,
- the second plug means (12) is provided with two of the pressing members (72), which radially face each other.

13. The clamping system as set forth in claim 12, wherein
- at least one other socket hole (3) is provided in the movable block (2),
- a third plug means (13) only for locking corresponding to said other socket hole (3) is provided in the reference block (1).

14. The clamping system as set forth in claim 13, wherein the third plug means (13) has the central pillar (20), the inner sleeve or the inner engaging member (21), the annular plug (71) and a plurality of the pressing members (72), and the central pillar (20) is fixed to the reference block (1), and the inner sleeve or the inner engaging member (21) is attached to the central pillar (20) radially movably.

15. The clamping system as set forth in claim 13, wherein the third plug means (13) has the central pillar (20), the inner sleeve or the inner engaging member (21), the annular plug (71) and a plurality of the pressing members (72), and the central pillar (20) is supported on the reference block (1) radially movably.

16. The clamping apparatus as set forth in claim 4, wherein
the inner engaging member (21) is diametrically expandable and contractible.

17. The clamping apparatus as set forth in claim 4, wherein
the outer engaging member (31, 72) is advanced toward the leading end by an advancing means (25), and during the locking movement, the outer engaging member (31, 72) moves toward the base end against the advancing means (25) while diametrically expanding.

18. The clamping apparatus as set forth in claim 4, wherein
the inner engaging member (21) is diametrically expandable and contractible, an annular clearance (92) is formed between the central pillar (20) and the inner engaging member (21), and during the locking movement, the outer engaging member (31, 72) diametrically contracts the inner engaging member (21), and the outer engaging member (31, 72) moves toward the base end while diametrically expanding.

19. The clamping apparatus as set forth in claim 4, wherein
the outer engaging member (31, 72) makes a wedge engagement with the inner engaging member (21) from the leading end side.

20. The clamping apparatus as set forth in claim 4, wherein
the outer engaging member (31, 72) makes a wedge engagement with the inner engaging member (21) from the base end side.

21. The clamping apparatus as set forth in claim 4, wherein
substantially an entire circumference of an inner peripheral surface of the engaging member (21) is adapted configured to come into close contact with an outer peripheral surface of the central pillar (20).

22. The clamping apparatus as set forth in claim 4, wherein
at least one slit (22) is provided in a peripheral wall of the inner engaging member (21), and the inner engaging member (21) is diametrically expandable by an inherent elastic restoring force.

23. The clamping apparatus as set forth in claim 4, and further comprising:
a pair of projecting portions (62) (62), which radially face each other, are provided on at least one of the outer periphery of the central pillar (20), an inner or outer periphery of the inner engaging member (21) and an inner or outer periphery of the outer engaging member (31), while escape grooves (63) (63) are formed between these projecting portions (62) (62).

24. The clamping apparatus as set forth in claim 4, wherein
the central pillar (20) is fixed to the reference block (1).

25. The clamping apparatus as set forth in claim 4, wherein
the central pillar (20) is supported on the reference block (1) radially movably.

* * * * *